United States Patent
Lu et al.

(10) Patent No.: US 9,713,189 B2
(45) Date of Patent: Jul. 18, 2017

(54) MULTIPLE OUTER LOOP LINK ADAPTATION

(71) Applicant: Telefonaktiebolaget L M Ericsson (publ), Stockholm (SE)

(72) Inventors: Guoqiang Lu, Ottawa (CA); Ping Yu, Ottawa (CA); Fredrik Huss, Sundbyberg (SE); Edward Mah, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 13/671,155

(22) Filed: Nov. 7, 2012

(65) Prior Publication Data

US 2014/0126467 A1 May 8, 2014

(51) Int. Cl.
*H04L 1/00* (2006.01)
*H04W 76/04* (2009.01)
*H04L 1/18* (2006.01)

(52) U.S. Cl.
CPC ........... *H04W 76/045* (2013.01); *H04L 1/003* (2013.01); *H04L 1/009* (2013.01); *H04L 1/1867* (2013.01)

(58) Field of Classification Search
CPC . H04L 27/2613; H04L 5/0007; H04L 1/1854; H04L 27/2605; H04L 5/0048; H04L 5/0051; H04L 5/0053; H04J 11/005; H04J 13/0062; H04W 72/046; H04W 72/121
USPC ........................... 370/254–350; 709/201–213
See application file for complete search history.

(56) References Cited

U.S. PATENT DOCUMENTS

| | | | | |
|---|---|---|---|---|
| 8,432,812 B2 * | 4/2013 | Park et al. | ..................... | 370/236 |
| 8,724,727 B2 * | 5/2014 | Oteri et al. | ................... | 375/267 |
| 8,743,783 B2 * | 6/2014 | Han et al. | ..................... | 370/328 |
| 8,914,686 B2 * | 12/2014 | Mohammadi et al. | ........ | 714/704 |
| 8,948,064 B2 * | 2/2015 | Shahar | .......................... | 370/278 |

(Continued)

FOREIGN PATENT DOCUMENTS

| | | |
|---|---|---|
| EP | 1505756 A2 | 2/2005 |
| EP | 2228933 A1 | 9/2010 |

OTHER PUBLICATIONS

International Preliminary Report on Patentability for PCT/IB2013/059020, mailed May 21, 2015, 15 pages.

(Continued)

*Primary Examiner* — Ayaz Sheikh
*Assistant Examiner* — Debebe Asefa
(74) *Attorney, Agent, or Firm* — Patent Portfolio Builders, PLLC

(57) ABSTRACT

Systems and methods for subframe-based link adaptation for a radio signal in a cellular communications network are disclosed. In one embodiment, a base station obtains a hybrid automatic repeat request acknowledgement for data transmitted between the base station and a mobile terminal in a radio signal of the base station. The base station then updates a parameter (e.g., SINR offset) used to control a Modulation and Coding Scheme (MCS) for transmission of data between the base station and the mobile terminal in the radio signal for one or more subframes in a frame structure of the radio signal based on the hybrid automatic repeat request acknowledgement. The one or more subframes are a subset of all of the subframes in the frame structure of the radio signal.

47 Claims, 14 Drawing Sheets

(56) References Cited

U.S. PATENT DOCUMENTS

| | | |
|---|---|---|
| 2008/0159192 A1 | 7/2008 | Lee et al. |
| 2009/0141673 A1 | 6/2009 | Hwang et al. |
| 2013/0095748 A1* | 4/2013 | Hu ..................... H04L 1/0003 455/8 |
| 2013/0223318 A1* | 8/2013 | Liu ..................... H04W 4/06 370/312 |
| 2013/0250869 A1* | 9/2013 | Eriksson ..................... 370/329 |
| 2015/0003425 A1* | 1/2015 | Kim et al. ..................... 370/336 |

OTHER PUBLICATIONS

Invitation to Pay Additional Fees and Partial International Search for PCT/IB2013/059020 mailed Apr. 8, 2014, 8 pages.
Ariyarante, Chamila Asanka, "Link Adaptation Improvements for Long Term Evolution (LTE)", Thesis paper for Blekinge Institute of Technology—Master of Science in Electrical Engineering, Nov. 2009, 73 pages, Karlskrona, Sweden.
International Search Report and Written Opinion for PCT/IB2013/059020, mailed Jul. 9, 2014, 20 pages.

* cited by examiner

MULTIPLE OUTER LOOP LINK ADAPTATION

FIELD OF THE DISCLOSURE

The present disclosure relates to link adaptation in a cellular communications network.

BACKGROUND

In Long Term Evolution (LTE) cellular communications networks, link adaptation is based on Adaptive Modulation and Coding (AMC). In general, each base station (i.e., enhanced Node B or eNodeB) adaptively controls a Modulation and Coding Scheme (MCS) for downlink transmissions to each mobile terminal (i.e., User Equipment or UE) served by the base station. Currently, LTE cellular communications networks support three modulation types, namely, Quadrature Phase Shift Keying (QPSK), 16 Quadrature Amplitude Modulation (QAM), and 64 QAM and a wide range of code rates that together provide numerous MCSs. More specifically, each mobile terminal periodically sends Channel State Information (CSI) reports to the base station and, based on the CSI reports from the mobile terminal, the base station adaptively controls the MCS for downlink transmissions to the mobile terminal.

An additional input to link adaptation is Hybrid Automatic Repeat Request (HARQ) acknowledgements (i.e., HARQ ACKs and HARQ NACKs) received from the mobile terminal in response to downlink transmissions to the mobile terminal. More specifically, as part of the HARQ functionality of the base station, the base station receives HARQ acknowledgements from each of the mobile terminals in response to downlink transmissions to the mobile terminal. The base station adaptively controls the MCS for downlink transmissions to each mobile terminal based on the CSI reports from the mobile terminal and the HARQ acknowledgements from the mobile terminal.

However, the inventors have found that when using the conventional adaptive MCS selection techniques described above, a Block Error Rate (BLER) for downlink transmissions to the mobile terminal may vary between subframes. For example, the inventors have found that when using the conventional adaptive MCS selection techniques described above, the BLER for some subframes can be as high as 50% whereas the BLER for other subframes can be as low as 0%. As a result, downlink throughput suffers. As such, there is a need for systems and methods for link adaptation that provide improved downlink throughput.

SUMMARY

Systems and methods for subframe-based link adaptation for a radio signal in a cellular communications network are disclosed. In one embodiment, a base station obtains a Hybrid Automatic Repeat Request (HARQ) acknowledgement for data transmitted between the base station and a mobile terminal in a radio signal. In one embodiment, the radio signal is a downlink signal from the base station to the mobile terminal in which case the base station receives the HARQ acknowledgment from the mobile terminal. In another embodiment, the radio signal is an uplink signal from the mobile terminal to the base station in which case the base station generates the HARQ acknowledgement locally. The base station then updates a parameter used to control a Modulation and Coding Scheme (MCS) for transmission of data in the radio signal for one or more subframes in a frame structure of the radio signal based on the HARQ acknowledgement. The one or more subframes are a subset of all of the subframes in the frame structure of the radio signal. In one embodiment, the parameter used to control the MCS is a Signal to Interference plus Noise (SINR) offset.

In one preferred embodiment, the radio signal is a downlink signal from a base station to a mobile terminal in a cellular communications network. In one embodiment, the base station receives a HARQ acknowledgement from a mobile terminal for data transmitted from the base station to the mobile terminal in a downlink signal of the base station. The base station then updates a parameter used to control a MCS for transmission of data to the mobile terminal in the downlink signal for one or more subframes in a frame structure of the downlink signal based on the HARQ acknowledgement. The one or more subframes are a subset of all of the subframes in the frame structure of the downlink signal. In one embodiment, the parameter used to control the MCS is a SINR offset.

In one embodiment, the one or more subframes for which the parameter used to control the MCS is updated to consist of only a single subframe in which the data was transmitted to the mobile terminal and for which the HARQ acknowledgement was received. In another embodiment, the one or more subframes for which the parameter used to control the MSC is updated are two or more subframes in a subframe bundle for HARQ reporting to the base station. In yet another embodiment, the one or more subframes for which the parameter used to control the MCS is updated are two or more subframes in a defined subframe group. In some exemplary embodiments, the defined subframe group is a group of subframes having sufficiently similar Block Error Rates (BLERs) or a group of subframes defined based on a priori information.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods for subframe-based link adaptation for a radio signal in a cellular communications network are disclosed. In the embodiments illustrated and described herein, the radio signal is a downlink signal from a base station to a mobile terminal in a cellular communications network. Notably, much of the discussion herein focuses on subframe-based link adaptation for downlink signals in a Long Term Evolution (LTE) cellular communications network. However, the concepts disclosed herein are not limited to downlink signals or LTE cellular communications networks. Rather, the concepts disclosed herein may be used to provide subframe-based link adaptation for other types of radio signals (e.g., uplink signals) and/or other types of cellular communications networks.

Figure 1:
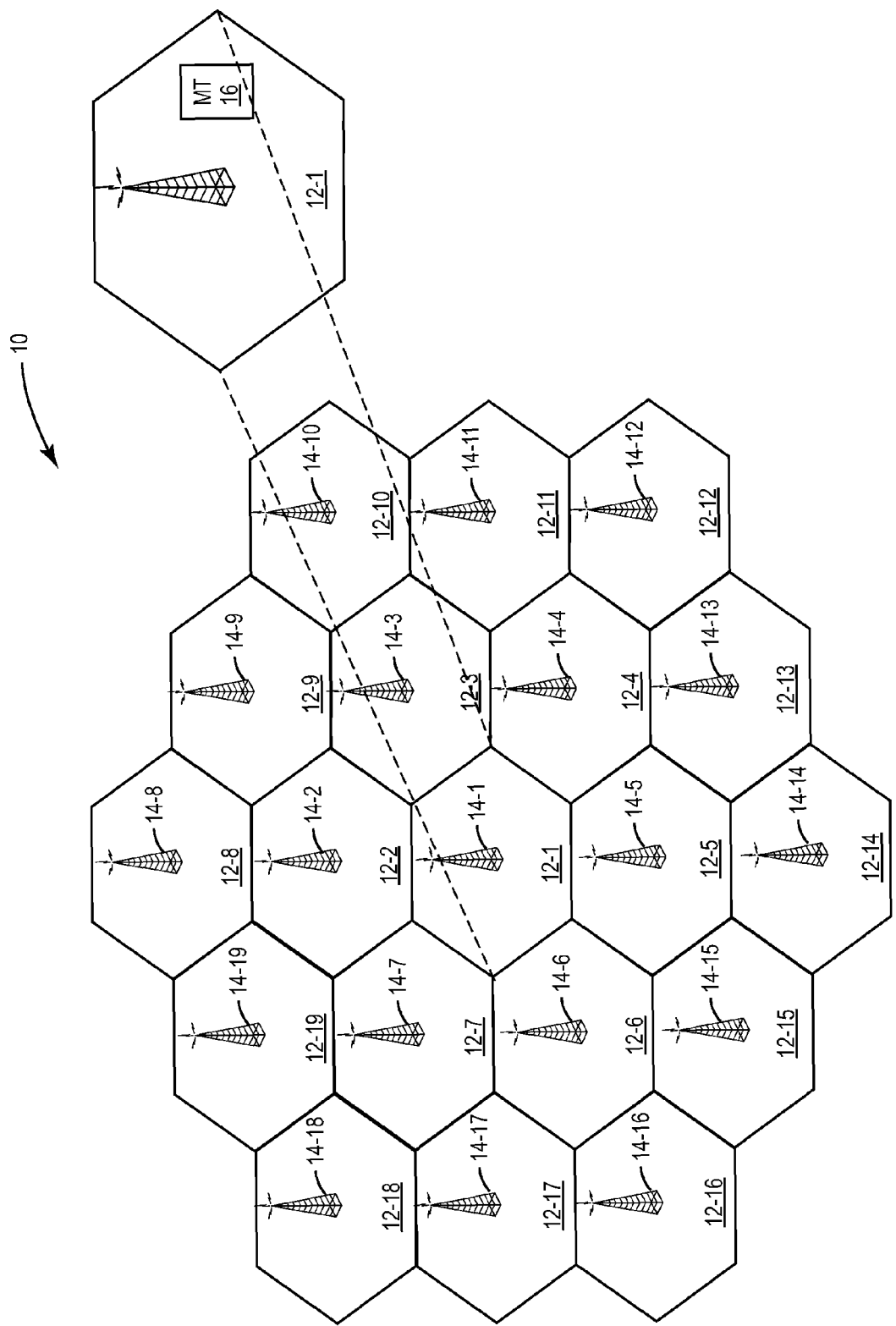
FIG. 1 illustrates a cellular communications network providing subframe-based link adaptation according to one embodiment of the present disclosure.

FIG. 1 illustrates a cellular communications network 10 that provides subframe-based link adaptation for downlink signals according to one embodiment of the present disclosure. In this embodiment, the cellular communications network 10 is an LTE cellular communications network. However, as discussed above, the present disclosure is not limited thereto. The cellular communications network 10 includes a number of cells 12-1 through 12-19, which are generally referred to herein collectively as cells 12 and individually as cell 12. Notably, while nineteen cells 12 are illustrated in FIG. 1 for clarity and ease of discussion, it will be readily appreciated by one of ordinary skill in the art that the cellular communications network 10 may include any number of cells 12 and, in most implementations, will include a relatively large number of cells 12.

In this embodiment, the cells 12-1 through 12-19 are served by corresponding base stations 14-1 through 14-19, which are generally referred to herein collectively as base stations 14 and individually as base station 14. For LTE, the base stations 14 are typically enhanced Node Bs (eNBs) but may also include low power base stations (e.g., home eNBs or femto base stations). Further, while in this embodiment each of the base stations 14 serves only one cell 12, one or more of the base stations 14 may alternatively serve multiple cells 12. For instance, in LTE, an eNB may serve multiple cells, or sectors. The base stations 14 provide cellular communications services (e.g., voice and data services) to mobile terminals (MTs), such as a mobile terminal 16 located in the cell 12-1. While only one mobile terminal 16 is illustrated in FIG. 1, it will be readily appreciated by one of ordinary skill in the art that the cellular communications network 10 will typically serve hundreds, thousands, or even millions of mobile terminals.

In order to compensate for variations in the instantaneous channel conditions for the downlinks to the mobile terminals 16, the base stations 14 perform link adaptation. For LTE, link adaptation is performed via Adaptive Modulation and Coding (AMC). As discussed below, the present disclosure relates to systems and methods for subframe-based link adaptation and, more particularly, subframe-based adaptive Modulation and Coding Scheme (MCS) selection for downlink transmissions from the base stations 14 to the mobile terminals 16.

Figure 2:
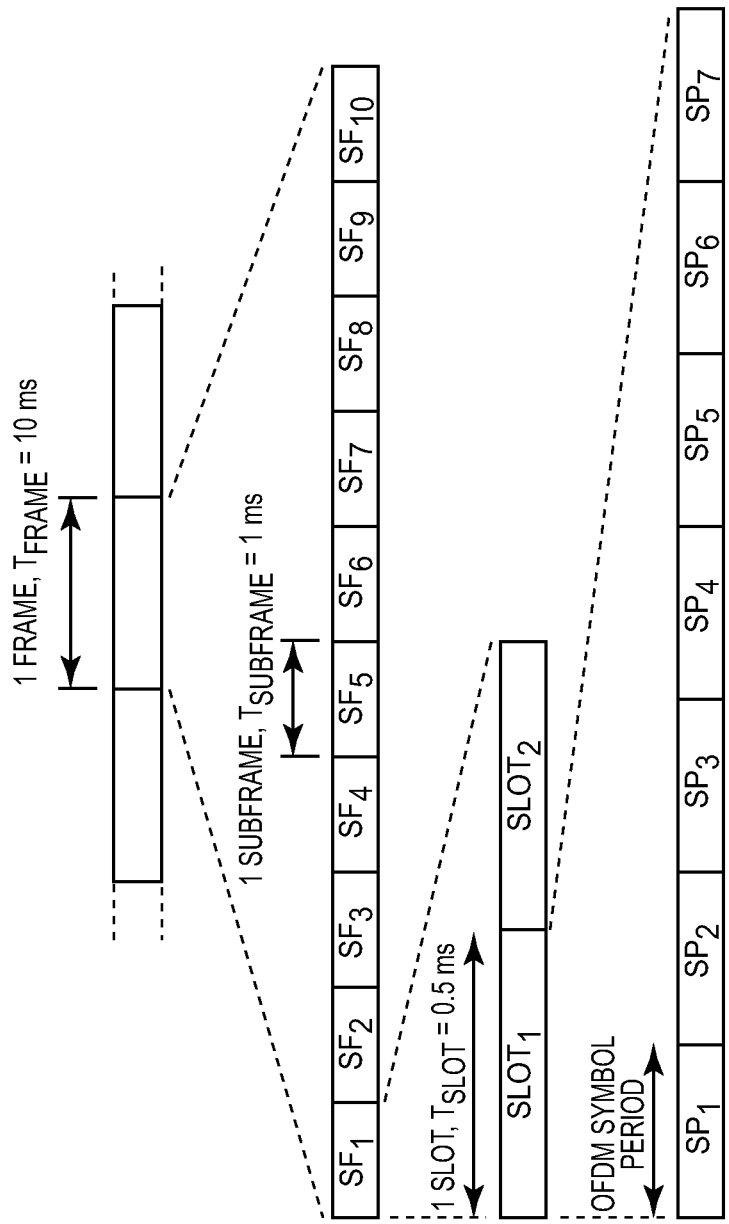
FIG. 2 illustrates a downlink frame structure for downlink signals from the base stations in FIG. 1 according to one embodiment of the present disclosure.

Before discussing embodiments of the present disclosure, a brief discussion of a conventional LTE downlink frame structure for downlink signals from the base stations 14 to the mobile terminals 16 and a conventional LTE link adaptation system are provided. In this regard, FIG. 2 illustrates the conventional downlink frame structure for a downlink signal in an LTE cellular communications network. As illustrated, in the time domain, the downlink signal is organized into 10 millisecond (ms) radio frames. Each radio frame consists of ten subframes, each having a duration of 1 ms. The subframes within a frame are referred to herein as subframes 1 through 10 ($SF_1$-$SF_{10}$). Further, for normal downlink subframes, each subframe consists of two slots, where each slot has a duration of 0.5 ms and consists of seven Orthogonal Frequency Division Multiplexing (OFDM) symbol periods. The two slots within a subframe are referred to herein as slots 1 and 2 ($SLOT_1$, $SLOT_2$), and the seven OFDM symbol periods within a slot are referred to herein as OFDM symbol periods 1 through 7 ($SP_1$-$SP_7$).

Figure 3:
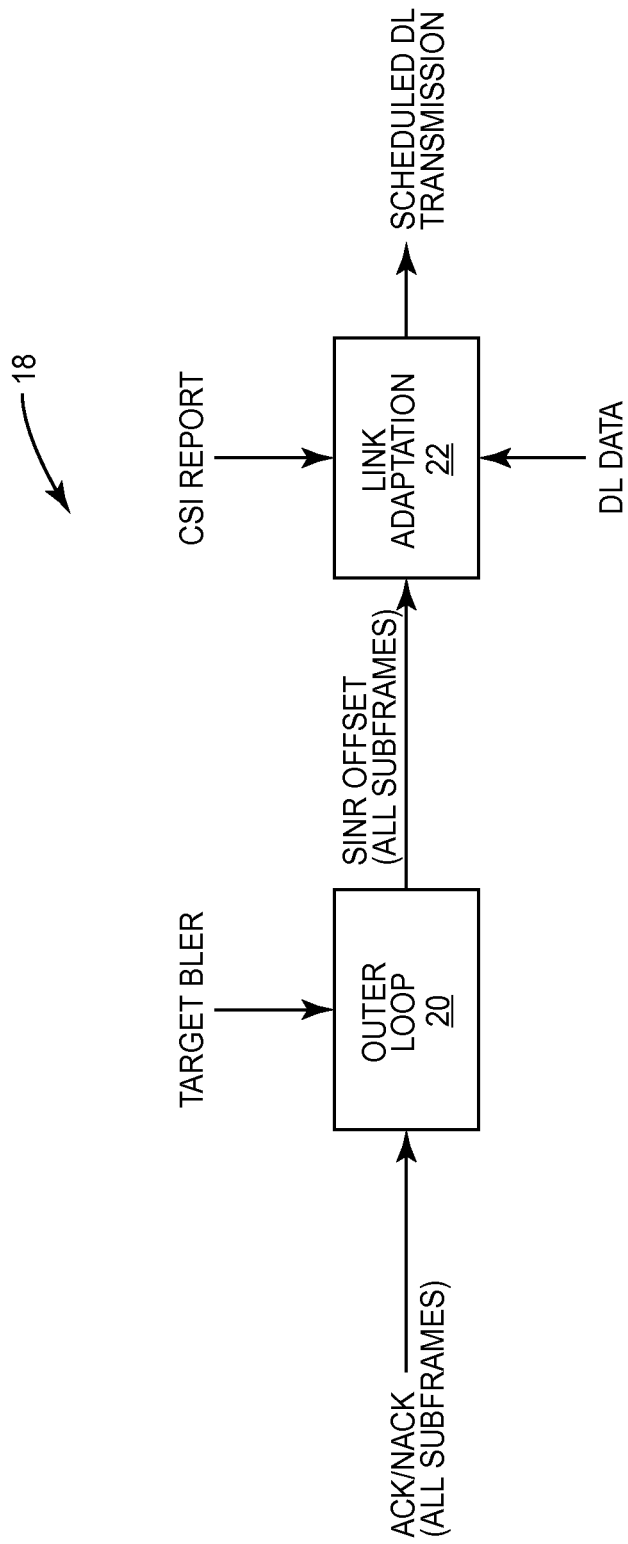
FIG. 3 illustrates a conventional link adaptation system that includes only a single outer loop for all subframes.

FIG. 3 illustrates a conventional link adaptation system 18 of a conventional base station that performs link adaptation for downlink transmissions to a particular mobile terminal. As illustrated, the link adaptation system 18 includes an outer loop 20 and a link adaptation function 22. In operation, the outer loop 20 receives Hybrid Automatic Repeat Request (HARQ) acknowledgements from the mobile terminal for downlink transmissions to the mobile terminal. Notably, as used herein, a HARQ acknowledgement is either a positive HARQ acknowledgement (i.e., a HARQ ACK) or a negative HARQ acknowledgement (i.e., a HARQ NACK). The outer loop 20 processes the HARQ acknowledgements from the mobile terminal regardless of the subframes in which the corresponding downlink transmissions were transmitted and a target Block Error Rate (BLER) to generate a Signal to Interference plus Noise (SINR) offset. The SINR offset is a single SINR offset for all subframes of the downlink frame structure.

The link adaptation function 22 performs link adaptation for downlink transmissions to the mobile terminal based on the SINR offset from the outer loop and Channel State Information (CSI) reports from the mobile terminal. Each CSI report includes a channel quality SINR for the downlink channel from the base station to the mobile terminal. More specifically, the link adaptation function 22 receives downlink data for a downlink transmission to the mobile terminal scheduled for a particular subframe, selects a MCS for the downlink transmission based on the SINR offset from the outer loop 20 and the channel quality SINR from the CSI report, and outputs the downlink transmission with the selected MCS. In this manner, link adaptation for downlink transmissions to the mobile terminal is performed for all subframes based on HARQ acknowledgements received for all subframes.

Noise and interference for a mobile terminal may be significantly different from subframe to subframe. In addition, in LTE, a pseudo-random sequence generator seed is also different from subframe to subframe, which results in different Peak-to-Average Ratio (PAR) in different subframes. If a PAR reduction algorithm is used in the base station, an Error Vector Magnitude (EVM) caused by clipping will also be subframe dependent. As such, the inventors have found that using the conventional link adaptation scheme results in some subframes having a BLER as high as 50% while other subframes have a BLER as low as 0%. This translates to a too conservative MCS in subframes with low BLER and a too aggressive MCS in subframes with higher BLER. As a result, downlink throughput suffers.

Figure 4:
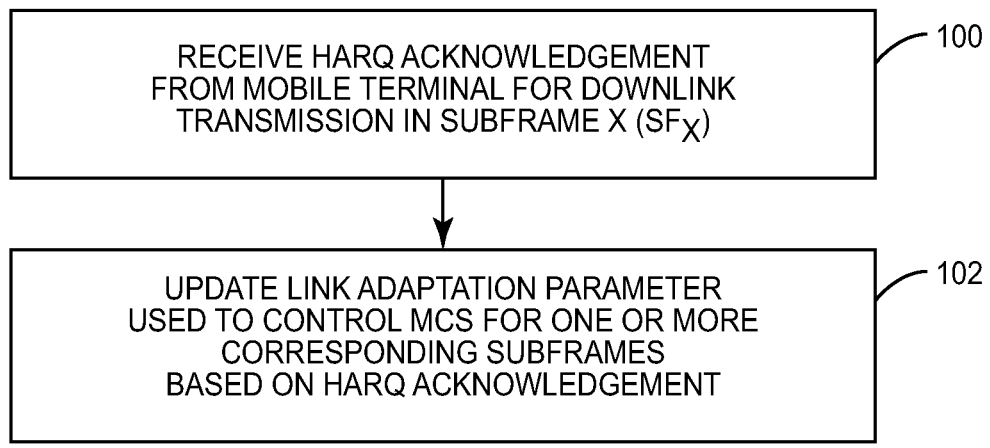
FIG. 4 is a flow chart that illustrates a process for updating a link adaptation parameter for subframe-based link adaptation according to one embodiment of the present disclosure.

In the present disclosure, systems and methods for subframe-based link adaptation are disclosed. The disclosed subframe-based link adaptation systems and methods result in improved downlink throughput. In this regard, FIG. 4 is a flow chart that illustrates a process for updating a link adaptation parameter for a subframe-based link adaptation process according to one embodiment of the present disclosure. As illustrated, the base station 14 receives a HARQ acknowledgement from the mobile terminal 16 for a downlink transmission from the base station 14 to the mobile terminal 16 in subframe X ($SF_X$) in the downlink frame structure (step 100). Subframe X ($SF_X$) is any of the subframes ($SF_1$ through $SF_{10}$) in the downlink frame structure (FIG. 2). The HARQ acknowledgement is either a positive HARQ acknowledgement or a negative HARQ acknowledgement for a downlink transmission from the base station 14 to the mobile terminal 16 in $SF_X$. In LTE, the HARQ acknowledgement for the downlink transmission in $SF_X$ is received from the mobile terminal 16 a known amount of time after the downlink transmission. Thus, when the base station 14 receives the HARQ acknowledgment, the base station 14 is enabled to determine that the HARQ acknowledgement is for the downlink transmission in $SF_X$.

In response to receiving the HARQ acknowledgement from the mobile terminal 16 for the downlink transmission in $SF_X$, the base station 14 then updates a link adaptation parameter used to control a MCS for one or more corresponding subframes based on the HARQ acknowledgement (step 102). As discussed below in detail, depending on the particular embodiment, the one or more corresponding subframes consist of: (1) only $SF_X$, (2) only a bundle of subframes including $SF_X$ in the case of subframe bundling during Time Division Duplexing (TDD) operation, or (3) only a group of subframes that include $SF_X$ where the group of subframes consists of two or more but less than all of the subframes in the downlink frame structure. In one preferred embodiment, the link adaptation parameter is an SINR offset. In general, the link adaptation parameter is updated such that, over time, the MCS is increased in response to positive HARQ acknowledgement(s) and decreased in response to negative HARQ acknowledgement(s). As used herein, an "increased" MCS is a more aggressive MCS (i.e., a MCS that uses a more aggressive modulation type and/or a higher code rate). Conversely, a "decreased" MCS is a less aggressive MCS (i.e., a MCS that uses a less aggressive modulation type and/or a lower code rate).

Figure 5:
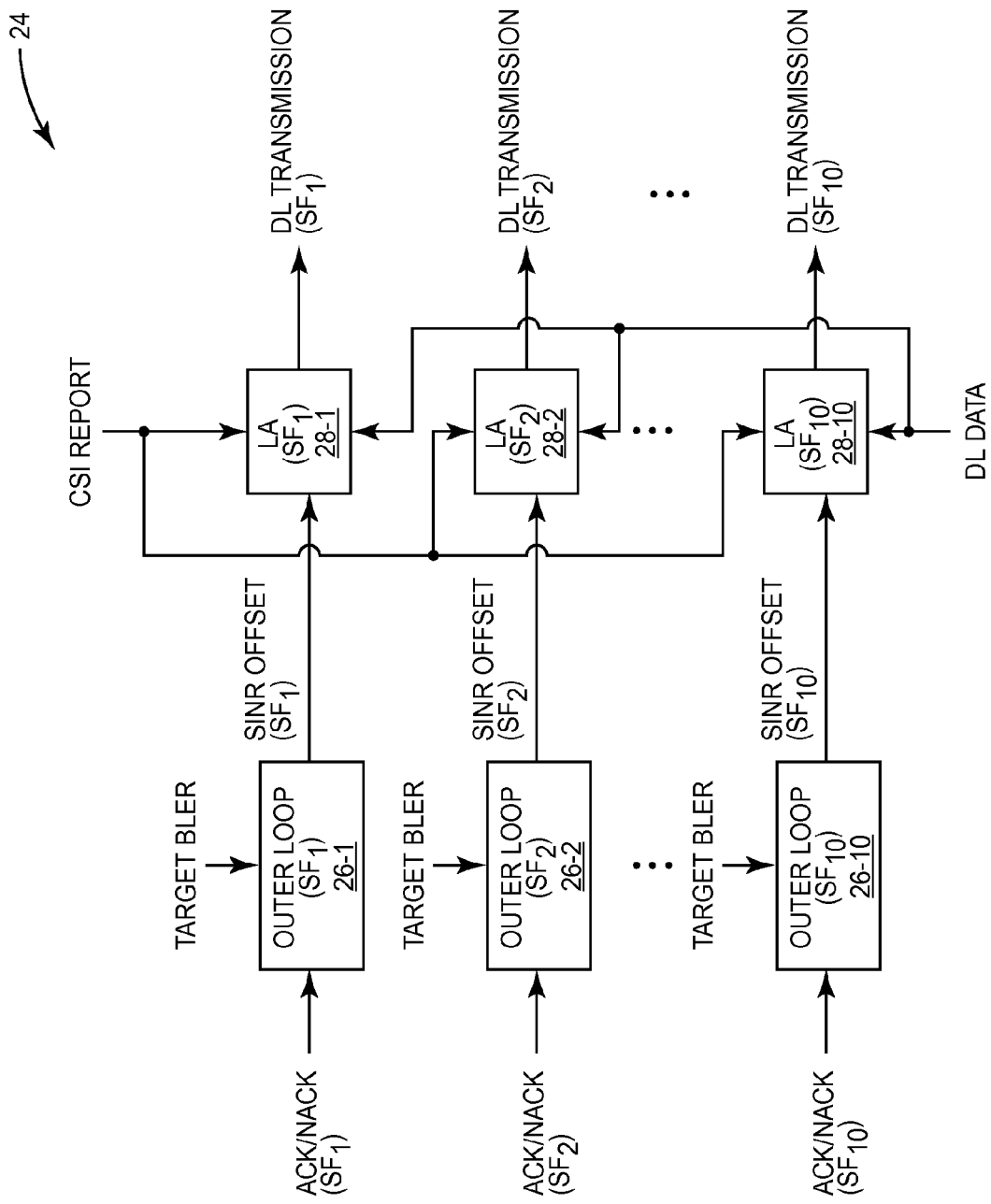
FIG. 5 illustrates a link adaptation system that includes an outer loop for each subframe of the frame structure of the downlink channel according to one embodiment of the present disclosure.

FIG. 5 illustrates a link adaptation system 24 that performs a subframe-based link adaptation process according to one embodiment of the present disclosure. Notably, each of the base stations 14 includes a separate link adaptation system 24 for each mobile terminal 16 served by the base station 14. As illustrated, the link adaptation system 24 includes outer loops 26-1 through 26-10 (generally referred to herein collectively as outer loops 26 and individually as outer loop 26) each for a different one of the subframes ($SF_1$ through $SF_{10}$) in the downlink frame structure (FIG. 2). Thus, the link adaptation system 24 includes a separate outer loop 26 for each of the subframes in the downlink frame structure. The link adaptation system 24 also includes link adaptation (LA) functions 28-1 through 28-10 for each of the subframes in the downlink frame structure. Note that while the link adaptation functions 28-1 through 28-10 are illustrated separately, the link adaptation functions 28-1 through 28-10 may be implemented separately or as part of a single link adaptation entity (e.g., a single link adaptation subsystem or process).

In operation, the outer loop 26-1 receives HARQ acknowledgements from the mobile terminal 16 for downlink transmissions to the mobile terminal in the first subframe ($SF_1$) of the downlink frame structure. Again, as used herein, a HARQ acknowledgement is either a positive HARQ acknowledgement (i.e., a HARQ ACK) or a negative HARQ acknowledgement (i.e., a HARQ NACK). The outer loop 26-1 processes the HARQ acknowledgements from the mobile terminal 16 for the first subframe ($SF_1$) and a target BLER to generate a SINR offset for the first subframe ($SF_1$). Notably, the SINR offset is an accumulated value (i.e., an accumulated SINR offset). The target BLER is preferably, but not necessarily, the same for all of the subframes ($SF_1$ through $SF_{10}$). In general, the outer loop 26-1 increases the SINR offset for the first subframe ($SF_1$) in response to a positive HARQ acknowledgement for the first subframe ($SF_1$) and decreases the SINR offset for the first subframe ($SF_1$) in response to a negative HARQ acknowledgement for the first subframe ($SF_1$). In one embodiment, a SINR offset step-up size when increasing the SINR offset and a SINR offset step-down size when decreasing the SINR offset are a function of the target BLER. In one particular embodiment, the step-up size and the step-down size are defined as:

$$\text{Target } BLER = \frac{1}{1 + \frac{SINR \text{ offset step-down size}}{SINR \text{ offset step-up size}}}.$$

So, if for example the target BLER is 10%, then a ratio of the SINR offset step-down size to the SINR offset step-up size is equal to 9.

The link adaptation function 28-1 for the first subframe ($SF_1$) performs link adaptation for downlink transmissions to the mobile terminal 16 scheduled for the first subframe ($SF_1$) based on the SINR offset for the first subframe ($SF_1$) from the outer loop 26-1 and CSI reports from the mobile terminal 16. Each CSI report includes a channel quality SINR for the downlink channel from the base station 14 to the mobile terminal 16. More specifically, the link adaptation function 28-1 receives downlink data for a downlink transmission to the mobile terminal 16 scheduled for the first subframe ($SF_1$), selects a MCS for the downlink transmission based on the SINR offset from the outer loop 26-1 for the first subframe ($SF_1$) and the channel quality SINR from the CSI report, and outputs the downlink (DL) transmission with the selected MCS. In one embodiment, the link adaptation function 28-1 selects the MCS for the first subframe ($SF_1$) based on the sum of the channel quality SINR from the CSI report and the SINR offset for the first subframe ($SF_1$). In general, MCS is selected such that the MCS increases (i.e., is more aggressive) as the sum of the channel quality SINR and the SINR offset increases and decreases (i.e., is less aggressive) as the sum of the channel quality SINR and the SINR offset decreases. In one particular implementation, each possible MCS has a corresponding range of SINR values, and the link adaptation function 28-1 selects the MCS for the range of SINR values in which the sum of the channel quality SINR and the SINR offset falls.

In the same manner, the outer loop 26-2 receives HARQ acknowledgements from the mobile terminal 16 for downlink transmissions to the mobile terminal 16 in the second subframe ($SF_2$) of the downlink frame structure. The outer loop 26-2 processes the HARQ acknowledgements from the mobile terminal 16 for the second subframe ($SF_2$) and the target BLER to generate a SINR offset for the second subframe ($SF_2$). Again, the SINR offset is an accumulated value (i.e., an accumulated SINR offset). In general, the outer loop 26-2 increases the SINR offset for the second subframe ($SF_2$) in response to a positive HARQ acknowledgement for the second subframe ($SF_2$) and decreases the SINR offset for the second subframe ($SF_2$) in response to a negative HARQ acknowledgement for the second subframe ($SF_2$). As discussed above, in one embodiment, a SINR offset step-up size when increasing the SINR offset and a SINR offset step-down size when decreasing the SINR offset are a function of the target BLER.

The link adaptation function 28-2 for the second subframe ($SF_2$) performs link adaptation for downlink transmissions to the mobile terminal 16 scheduled for the second subframe ($SF_2$) based on the SINR offset for the second subframe ($SF_2$) from the outer loop 26-2 and CSI reports from the mobile terminal 16. Each CSI report includes a channel quality SINR for the downlink channel from the base station 14 to the mobile terminal 16. More specifically, the link adaptation function 28-2 receives downlink data for a downlink transmission to the mobile terminal 16 scheduled for the second subframe ($SF_2$), selects a MCS for the downlink transmission based on the SINR offset from the outer loop 26-2 for the second subframe ($SF_2$) and the channel quality SINR from the CSI report, and outputs the downlink transmission with the selected MCS. In one embodiment, the link adaptation function 28-2 selects the MCS for the second subframe ($SF_2$) based on the sum of the channel quality SINR from the CSI report and the SINR offset for the second subframe ($SF_2$). In general, MCS is selected such that the MCS increases (i.e., is more aggressive) as the sum of the channel quality SINR and the SINR offset increases and decreases (i.e., is less aggressive) as the sum of the channel quality SINR and the SINR offset decreases. In one particular implementation, each possible MCS has a corresponding range of SINR values, and the link adaptation function 28-2 selects the MCS for the range of SINR values in which the sum of the channel quality SINR and the SINR offset falls.

The other outer loops 26-3 through 26-10 and link adaptation functions 28-3 through 28-10 operate in the same manner to provide link adaptation for the remaining subframes ($SF_3$ through $SF_{10}$). For example, the outer loop 26-10 receives HARQ acknowledgements from the mobile terminal 16 for downlink transmissions to the mobile terminal 16 in the tenth subframe ($SF_{10}$) of the downlink frame structure. The outer loop 26-10 processes the HARQ acknowledgements from the mobile terminal 16 for the tenth subframe ($SF_{10}$) and the target BLER to generate a SINR offset for the tenth subframe ($SF_{10}$). Again, the SINR offset is an accumulated value (i.e., an accumulated SINR offset). In general, the outer loop 26-10 increases the SINR offset for the tenth subframe ($SF_{10}$) in response to a positive HARQ acknowledgement for the tenth subframe ($SF_{10}$) and decreases the SINR offset for the tenth subframe ($SF_{10}$) in response to a negative HARQ acknowledgement for the tenth subframe ($SF_{10}$). As discussed above, in one embodiment, a SINR offset step-up size when increasing the SINR offset and a SINR offset step-down size when decreasing the SINR offset are a function of the target BLER.

The link adaptation function 28-10 for the tenth subframe ($SF_{10}$) performs link adaptation for downlink transmissions to the mobile terminal 16 scheduled for the tenth subframe ($SF_{10}$) based on the SINR offset for the tenth subframe ($SF_{10}$) from the outer loop 26-10 and CSI reports from the mobile terminal 16. Each CSI report includes a channel quality SINR for the downlink channel from the base station 14 to the mobile terminal 16. More specifically, the link adaptation function 28-10 receives downlink data for a downlink transmission to the mobile terminal 16 scheduled for the tenth subframe ($SF_{10}$), selects a MCS for the downlink transmission based on the SINR offset from the outer loop 26-10 for the tenth subframe ($SF_{10}$) and the channel quality SINR from the CSI report, and outputs the downlink transmission with the selected MCS. In one embodiment, the link adaptation function 28-10 selects the MCS for the tenth subframe ($SF_{10}$) based on the sum of the channel quality SINR from the CSI report and the SINR offset for the tenth subframe ($SF_{10}$). In general, MCS is selected such that the MCS increases (i.e., is more aggressive) as the sum of the channel quality SINR and the SINR offset increases and decreases (i.e., is less aggressive) as the sum of the channel quality SINR and the SINR offset decreases. In one particular implementation, each possible MCS has a corresponding range of SINR values, and the link adaptation function 28-10 selects the MCS for the range of SINR values in which the sum of the channel quality SINR and the SINR offset falls.

Thus, unlike the conventional link adaptation system 18 of FIG. 3 where a single SINR offset is generated for all subframes, the link adaptation system 24 of FIG. 5 generates separate SINR offsets for each of the subframes in the downlink frame structure. In this manner, the link adaptation system 24 provides subframe-based link adaptation and, as a result, subframe-based adaptive MCS selection. By doing so, the link adaptation system 24 compensates for variations in noise and interference from subframe to subframe as well as variations in the pseudo-random number generator seed from subframe to subframe. As a result, an appropriate MCS is selected for each subframe and, as a result, downlink throughput is substantially improved.

Figure 6:
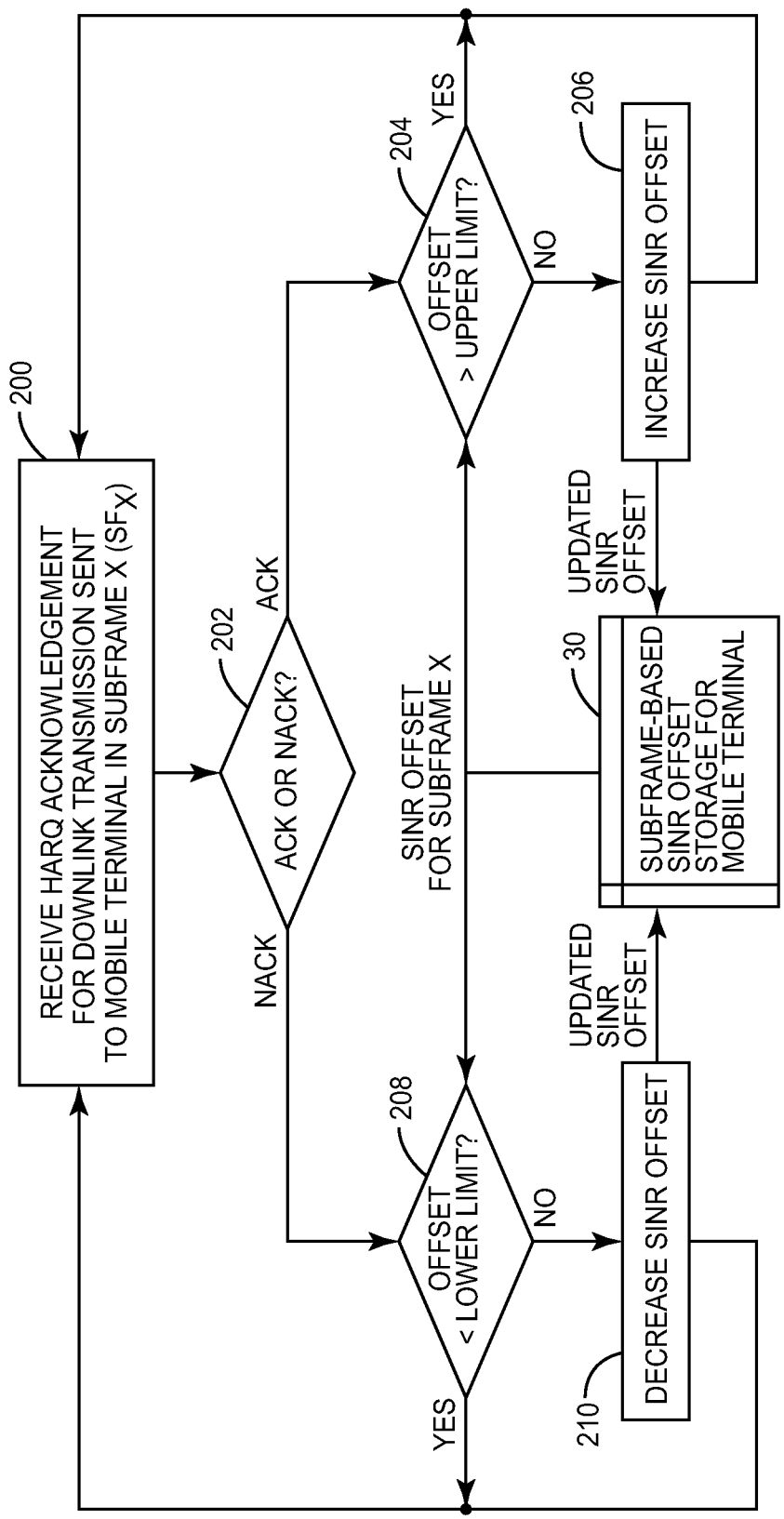
FIG. 6 is a flow chart that illustrates the operation of one of the outer loops of FIG. 5 to provide a link adaptation parameter, namely a Signal to Interference Plus Noise Ratio (SINR) offset, to enable subframe-based link adaptation according to one embodiment of the present disclosure.

FIG. 6 is a flow chart that illustrates the operation of one of the outer loops 26 of FIG. 5 according to one embodiment of the present disclosure. In particular, FIG. 6 illustrates the operation of the outer loop 26-X for subframe X ($SF_X$), where subframe X ($SF_X$) is any one of the subframes ($SF_1$ through $SF_{10}$) in the downlink frame structure (FIG. 2). The outer loop 26-X first receives a HARQ acknowledgement from the mobile terminal 16 for a downlink transmission to the mobile terminal 16 in $SF_X$ of the downlink frame structure (step 200). The outer loop 26-X then determines whether the HARQ acknowledgement is a positive HARQ acknowledgement (i.e., a HARQ ACK) or a negative HARQ acknowledgement (i.e., a HARQ NACK) (step 202). If the HARQ acknowledgement is a positive HARQ acknowledgement, the outer loop 26-X then determines whether the SINR offset for $SF_X$ for the mobile terminal 16 is greater than a predefined upper limit (step 204). Notably, the SINR offset for $SF_X$ for the mobile terminal 16 is stored by the base station 14 in a subframe-based SINR offset storage 30 for the mobile terminal 16.

If the SINR offset for $SF_X$ for the mobile terminal 16 is greater than the predefined upper limit, the process returns to step 200 in order to wait for and then process the next HARQ acknowledgement for $SF_X$ from the mobile terminal 16. However, if the SINR offset for $SF_X$ for the mobile terminal 16 is not greater than the predefined upper limit, the outer loop 26-X increases the SINR offset (step 206). The resulting updated SINR offset is then stored in the subframe-based SINR offset storage 30 for the mobile terminal 16. As discussed above, in one embodiment, the SINR offset step-up size when increasing the SINR offset is a function of the target BLER. After increasing the SINR offset for $SF_X$ for the mobile terminal 16, the process returns to step 200 in order to wait for and then process the next HARQ acknowledgement for $SF_X$ from the mobile terminal 16.

Returning to step 202, if the HARQ acknowledgement is a negative HARQ acknowledgement, the outer loop 26-X then determines whether the SINR offset for $SF_X$ for the mobile terminal 16 is less than a predefined lower limit (step 208). If the SINR offset for $SF_X$ for the mobile terminal 16 is less than the predefined lower limit, the process returns to step 200 in order to wait for and then process the next HARQ acknowledgement for $SF_X$ from the mobile terminal 16. However, if the SINR offset for $SF_X$ for the mobile terminal 16 is not less than the predefined lower limit, the outer loop 26-X decreases the SINR offset (step 210). The resulting updated SINR offset is then stored in the subframe-based SINR offset storage 30 for the mobile terminal 16. As discussed above, in one embodiment, the SINR offset step-down size when decreasing the SINR offset is a function of the target BLER. After decreasing the SINR offset for $SF_X$ for the mobile terminal 16, the process returns to step 200 in order to wait for and then process the next HARQ acknowledgement for $SF_X$ from the mobile terminal 16.

Figure 7:
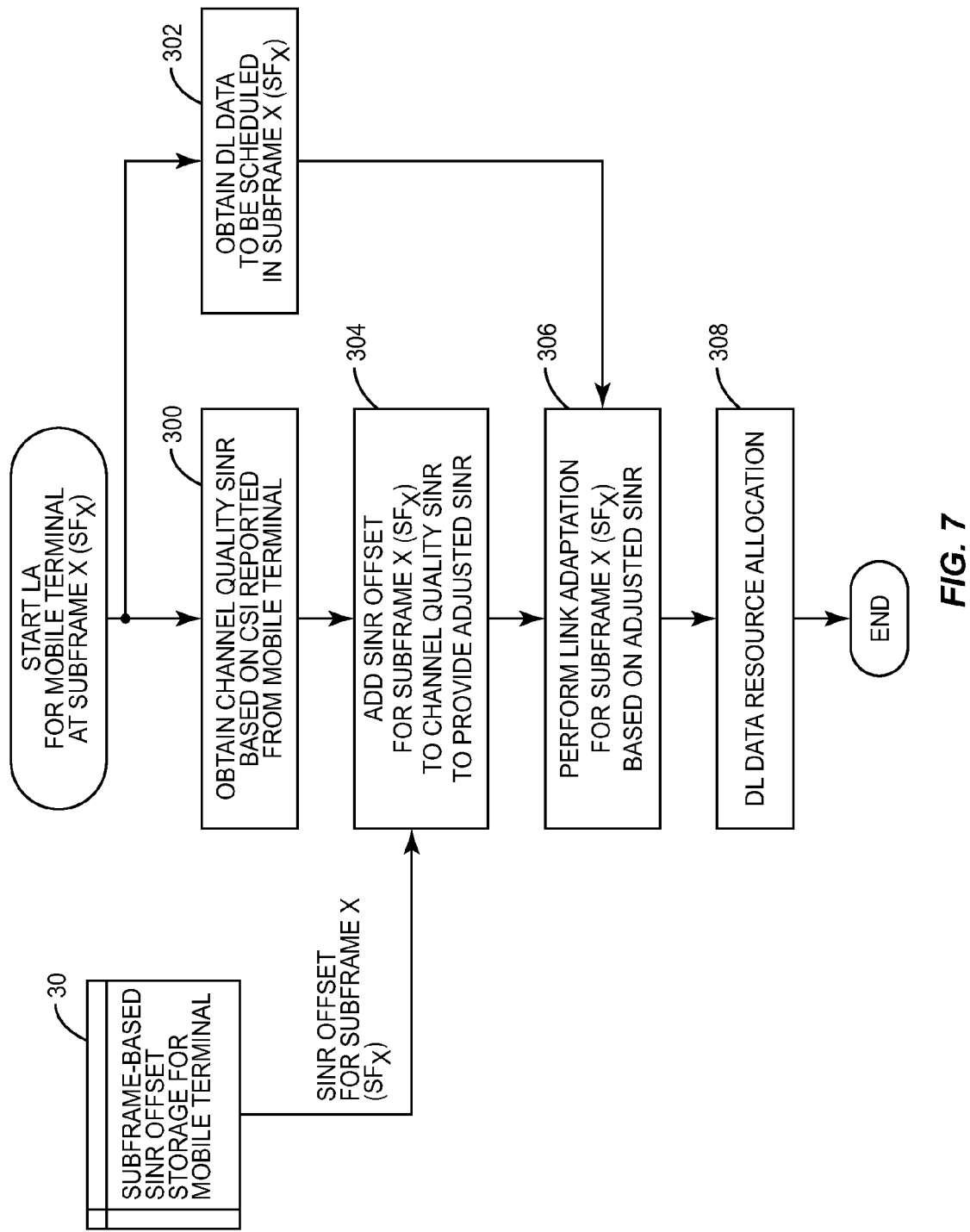
FIG. 7 is a flow chart that illustrates the operation of the link adaptation function of FIG. 5 to adaptively select a Modulation and Coding Scheme (MCS) for a subframe based on the link adaptation parameter from the outer loop for the subframe according to one embodiment of the present disclosure.

FIG. 7 is a flow chart that illustrates the operation of one of the link adaptation functions 28 of FIG. 5 according to one embodiment of the present disclosure. In particular, FIG. 7 illustrates the operation of the link adaptation function 28-X for subframe X ($SF_X$) where $SF_X$ is any one of the subframes ($SF_1$ through $SF_{10}$) in the downlink frame structure (FIG. 2). First, the link adaptation function 28-X obtains a channel quality SINR based on the CSI report from the mobile terminal 16 (step 300). In LTE, the CSI report includes a Channel-Quality Indicator (CQI) that represents the channel quality SINR. In addition, the link adaptation function 28-X obtains downlink data to be scheduled for transmission to the mobile terminal 16 in $SF_X$ (step 302).

Next, the link adaptation function 28-X adds the SINR offset for $SF_X$ generated by the outer loop 26-X and the channel quality SINR obtained from the CSI report to provide an adjusted SINR (step 304). The link adaptation function 28-X then performs link adaptation for $SF_X$ based on the adjusted SINR (step 306). More specifically, the link adaptation function 28-X selects or updates the MCS for $SF_X$ for the mobile terminal 16 based on the adjusted SINR. Lastly, the link adaptation function 28-X allocates downlink resources for a downlink transmission of the downlink data in $SF_X$ using the selected MCS (step 308).

Figure 8:
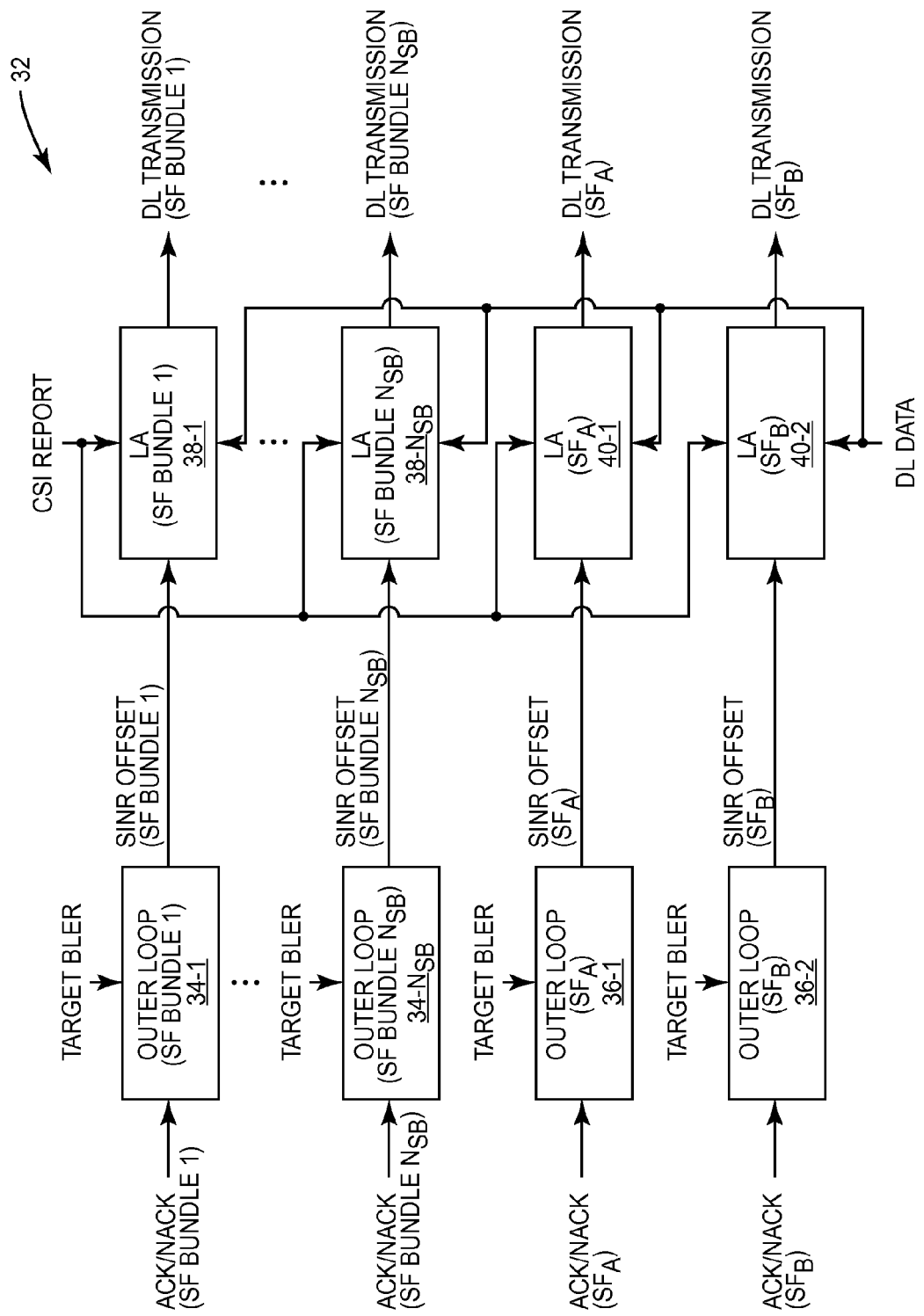
FIG. 8 illustrates a link adaptation system that includes an outer loop for each of a number of subframes and subframe bundles according to another embodiment of the present disclosure.

FIG. 8 illustrates a link adaptation system 32 according to another embodiment of the present disclosure. This embodiment is similar to that of FIG. 5 but where one or more subframe bundles are defined for HARQ acknowledgements. More specifically, for TDD operation, LTE provides for subframe bundling for HARQ acknowledgements. In this case, a single HARQ acknowledgement is a HARQ acknowledgement for data transmissions in two or more subframes forming the subframe bundle. The HARQ acknowledgement for a subframe bundle is a positive HARQ acknowledgement if the downlink data transmissions to the mobile terminal 16 in all of the subframes in the subframe bundle were successfully decoded by the mobile terminal 16; otherwise, the HARQ acknowledgement is a negative HARQ acknowledgement.

As illustrated in FIG. 8, the link adaptation system 32 includes outer loops 34-1 through 34-$N_{SB}$ for corresponding subframe bundles (SF Bundle 1 through SF Bundle $N_{SB}$), where $N_{SB}$ is the number of subframe bundles. The number of subframe bundles ($N_{SB}$) is an integer greater than or equal to 1 but is typically an integer greater than or equal to 2. Each of the outer loops 34-1 through 34-$N_{SB}$ is for a different subframe bundle. Each subframe bundle includes two or more of the subframes in the downlink frame structure (FIG. 2). The specific subframe bundles depend on the uplink and downlink configuration. For some uplink and downlink configurations, not all subframes are included in a subframe bundle. As such, the link adaptation system 32 may also include a separate outer loop for each subframe that is not included in any of the subframe bundles. In this example, subframes A and B ($SF_A$ and $SF_B$) are not in a subframe bundle, where subframes A and B are particular ones of the subframes ($SF_1$ and $SF_2$) in the downlink frame structure. As such, the link adaptation system 32 includes an outer loop 36-1 for $SF_A$ and an outer loop 36-2 for $SF_B$.

The operation of the outer loops 34-1 through 34-$N_{SB}$ and corresponding link adaptation functions 38-1 through 38-$N_{SB}$ is substantially the same as that described above with respect to FIGS. 6 and 7 but where the SINR offsets are generated for the subframe bundles rather than the individual subframes. More specifically, in operation, the outer loop 34-1 receives HARQ acknowledgements from the mobile terminal 16 for downlink transmissions to the mobile terminal 16 in the subframes in the first subframe bundle (SF Bundle 1). Again, as used herein, a HARQ acknowledgement is either a positive HARQ acknowledgement (i.e., a HARQ ACK) or a negative HARQ acknowledgement (i.e., a HARQ NACK). The outer loop 34-1 processes the HARQ acknowledgements from the mobile terminal 16 for the first subframe bundle (SF Bundle 1) and a target BLER to generate a SINR offset for the first subframe bundle (SF Bundle 1). Notably, the target BLER is preferably, but not necessarily, the same for all of the subframe bundles and any individual subframes. In general, the outer loop 34-1 increases the SINR offset for the first subframe bundle (SF Bundle 1) in response to a positive HARQ acknowledgement for the first subframe bundle (SF Bundle 1) and decreases the SINR offset for the first subframe bundle (SF Bundle 1) in response to a negative HARQ acknowledgement for the first subframe bundle (SF Bundle 1). In one embodiment, a SINR offset step-up size when increasing the SINR offset and a SINR offset step-down size when decreasing the SINR offset are a function of the target BLER. In one particular embodiment, the step-up size and the step-down size are defined as:

$$\text{Target } BLER = \frac{1}{1 + \frac{SINR \text{ offset step-down size}}{SINR \text{ offset step-up size}}}.$$

So, if for example the target BLER is 10%, then a ratio of the SINR offset step-down size to the SINR offset step-up size is equal to 9.

The link adaptation function 38-1 for the first subframe bundle (SF Bundle 1) performs link adaptation for downlink transmissions to the mobile terminal 16 scheduled for the subframes in the first subframe bundle (SF Bundle 1) based on the SINR offset for the first subframe bundle (SF Bundle 1) from the outer loop 34-1 and CSI reports from the mobile terminal 16. Each CSI report includes a channel quality SINR for the downlink channel from the base station 14 to the mobile terminal 16. More specifically, the link adaptation function 38-1 receives downlink data for a downlink transmission to the mobile terminal 16 scheduled for one of the subframes in the first subframe bundle (SF Bundle 1), selects a MCS for the downlink transmission based on the SINR offset from the outer loop 34-1 for the first subframe bundle (SF Bundle 1) and the channel quality SINR from the CSI report, and outputs the downlink transmission with the selected MCS. In one embodiment, the link adaptation function 38-1 selects the MCS for the downlink transmission based on the sum of the channel quality SINR from the CSI report and the SINR offset for the first subframe bundle (SF Bundle 1). In general, MCS is selected such that the MCS increases (i.e., is more aggressive) as the sum of the channel quality SINR and the SINR offset increases and decreases (i.e., is less aggressive) as the sum of the channel quality SINR and the SINR offset decreases. In one particular implementation, each possible MCS has a corresponding range of SINR values, and the link adaptation function 38-1 selects the MCS for the range of SINR values in which the sum of the channel quality SINR and the SINR offset falls.

In the same manner, the outer loop $34\text{-}N_{SB}$ receives HARQ acknowledgements from the mobile terminal 16 for downlink transmissions to the mobile terminal 16 in the subframes in the $N_{SB}$-th subframe bundle (SF Bundle $N_{SB}$). The outer loop $34\text{-}N_{SB}$ processes the HARQ acknowledgements from the mobile terminal 16 for the $N_{SB}$-th subframe bundle (SF Bundle $N_{SB}$) and the target BLER to generate a SINR offset for the $N_{SB}$-th subframe bundle (SF Bundle $N_{SB}$). In general, the outer loop $34\text{-}N_{SB}$ increases the SINR offset for the $N_{SB}$-th subframe bundle (SF Bundle $N_{SB}$) in response to a positive HARQ acknowledgement for the $N_{SB}$-th subframe bundle (SF Bundle $N_{SB}$) and decreases the SINR offset for the $N_{SB}$-th subframe bundle (SF Bundle $N_{SB}$) in response to a negative HARQ acknowledgement for the $N_{SB}$-th subframe bundle (SF Bundle $N_{SB}$). As discussed above, in one embodiment, a SINR offset step-up size when increasing the SINR offset and a SINR offset step-down size when decreasing the SINR offset are a function of the target BLER.

The link adaptation function $38\text{-}N_{SB}$ for the $N_{SB}$-th subframe bundle (SF Bundle $N_{SB}$) performs link adaptation for downlink transmissions to the mobile terminal 16 scheduled for one of the subframes in the $N_{SB}$-th subframe bundle (SF Bundle $N_{SB}$) based on the SINR offset for the $N_{SB}$-th subframe bundle (SF Bundle $N_{SB}$) from the outer loop $34\text{-}N_{SB}$ and CSI reports from the mobile terminal 16. Each CSI report includes a channel quality SINR for the downlink channel from the base station 14 to the mobile terminal 16. More specifically, the link adaptation function $38\text{-}N_{SB}$ receives downlink data for a downlink transmission to the mobile terminal 16 scheduled for one of the subframes in the $N_{SB}$-th subframe bundle (SF Bundle $N_{SB}$), selects a MCS for the downlink transmission based on the SINR offset from the outer loop $34\text{-}N_{SB}$ for the $N_{SB}$-th subframe bundle (SF Bundle $N_{SB}$) and the channel quality SINR from the CSI report, and outputs the downlink transmission with the selected MCS. In one embodiment, the link adaptation function $38\text{-}N_{SB}$ selects the MCS for the downlink transmission based on the sum of the channel quality SINR from the CSI report and the SINR offset for the $N_{SB}$-th subframe bundle (SF Bundle $N_{SB}$). In general, MCS is selected such that the MCS increases (i.e., is more aggressive) as the sum of the channel quality SINR and the SINR offset increases and decreases (i.e., is less aggressive) as the sum of the channel quality SINR and the SINR offset decreases. In one particular implementation, each possible MCS has a corresponding range of SINR values, and the link adaptation function $38\text{-}N_{SB}$ selects the MCS for the range of SINR values in which the sum of the channel quality SINR and the SINR offset falls.

The outer loop 36-1 and a corresponding link adaptation function 40-1 operate in the manner described above with respect to FIGS. 5 through 7 to provide link adaptation for $SF_A$. Likewise, the outer loop 36-2 and a corresponding link adaptation function 40-2 operate in the manner described above with respect to FIGS. 5 through 7 to provide link adaptation for $SF_B$. Note that while the link adaptation functions 38-1 through $38\text{-}N_{SB}$, 40-1, and 40-2 are illustrated separately, the link adaptation functions 38-1 through $38\text{-}N_{SB}$, 40-1, and 40-2 may be implemented separately or as part of a single link adaptation entity (e.g., a single link adaptation subsystem or process).

Figure 9:
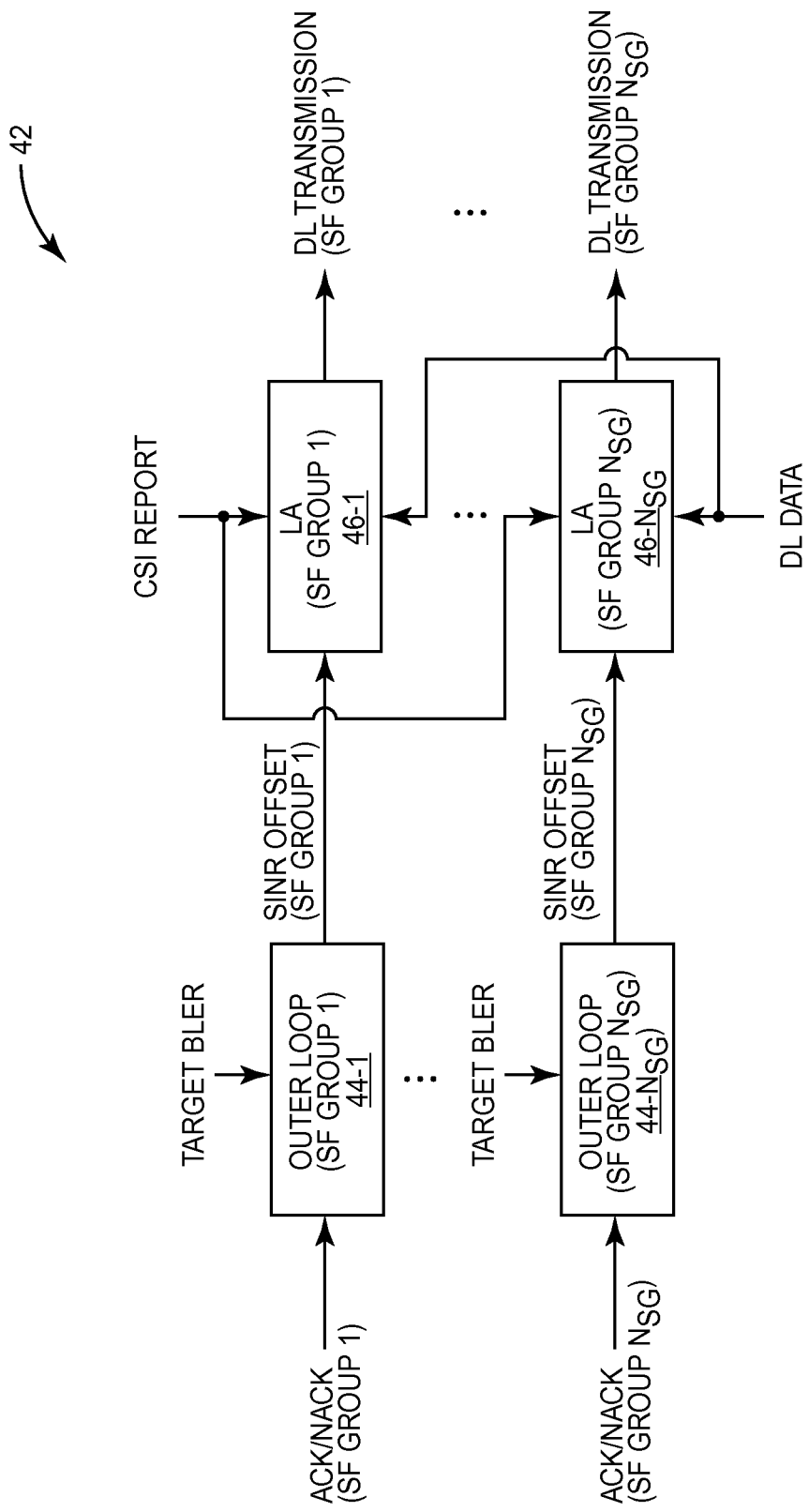
FIG. 9 illustrates a link adaptation system that includes an outer loop for each of a number of subframe groups according to another embodiment of the present disclosure.

FIG. 9 illustrates a link adaptation system 42 according to another embodiment of the present disclosure. This embodiment is similar to that of FIG. 5 but where one or more subframe groups are defined. Each of the subframe groups includes a subset of the subframes in the downlink frame structure (FIG. 2). More specifically, each of the subframe groups includes one or more subframes but not all of the subframes in the downlink frame structure. At least one of the subframe groups includes two or more subframes in the downlink structure. Further, each subframe is included in only one subframe group. The subframe groups may be defined in any suitable manner. As one example, subframes having sufficiently similar BLERs are grouped into a subframe group. As used there, subframes having "sufficiently similar" BLERs are subframes having BLERs that are within a predefined range of one another. For instance, the first subframe group may be for subframes that, without subframe-based link adaptation (i.e., with a conventional link adaptation or with link adaptation without an outer loop), have BLERs in the range of 0 to 10%; the second subframe group may be for subframes that, without subframe-based link adaptation (i.e., with a conventional link adaptation or with link adaptation without an outer loop), have BLERs in the range of 10 to 20%; etc.

As another example, the subframes may be grouped based on a priori information. For instance, in one embodiment, one subframe group is defined for subframes in which macro base stations transmit Almost Blank Subframes (ABSs) and another subframe group is defined for other subframes. More specifically, in heterogeneous networks or when in-band relays are used, the interference may be different between subframes. For example, in heterogeneous networks some subframes could be reserved for data transmissions from low power nodes such that the macro nodes, or macro base stations, transmit ABSs in those reserved subframes. In this case it could be beneficial to have a separate subframe group for those subframes.

In another embodiment, separate subframe groups can be defined depending on the number of subframes bundled for ACK/NACK reporting. More specifically, in TDD with Transmit Time Interval (TTI) bundling (i.e., ACK/NACK bundling), the ACK/NACK responses for a number of downlink subframes are bundled and transmitted in one uplink subframe. The uplink subframes may have different numbers of bundled downlink subframes depending on the uplink/downlink configuration. As the probability that any downlink subframe cannot be decoded increases with the number of bundled subframes, the probability of reporting a NACK will also increase. To keep the probability of retransmitting any subframe fixed, it may be beneficial to have separate subframe groups depending on the number of bundled downlink subframes for ACK/NACK reporting. For example, in uplink/downlink configuration 1 in 3rd Generation Partnership Project (3GPP) Technical Specification (TS) 36.211, the ACK/NACK for downlink subframes {0,1} is transmitted in uplink subframe 7, ACK/NACK for downlink subframe 4 is transmitted in uplink subframe 8, ACK/NACK for downlink subframes {5, 6} is transmitted in uplink subframe 2, and ACK/NACK for downlink subframe 9 is transmitted in uplink subframe 2. One could then have one subframe group and thus one outer loop for downlink subframes {0, 1, 5, 6} and another subframe group and thus another outer loop for downlink subframes {4, 9}.

Note that, in another embodiment, link adaptation is performed at the base station 14 for uplink transmissions from the mobile terminal 16 based on HARQ acknowledgments generated locally at the base station 14. The link adaptation decision is then sent to the mobile terminal 16. In this case, a priori information may be used to define the subframe groups at the mobile terminal 16. For example, in one embodiment, one subframe group is defined for subframe(s) containing a Sounding Reference Signal (SRS) symbol(s) and another subframe group is defined for the next subframe(s) immediately following the subframe(s) containing SRS symbol(s). More specifically, with SRS transmission in the uplink, there might be interference between the sounding symbol and the previous and/or next data symbol. The interference comes from the power ramping between SRS and data transmissions and can vary between mobile terminal implementations. Therefore, it may then be beneficial to have a separate subframe group for the subframe containing the SRS symbol and/or a separate outer loop for the next subframe. This will avoid badly performing mobile terminal implementations having degraded throughput for all uplink subframes if there is only one outer loop.

As illustrated in FIG. 9, the link adaptation system 42 includes outer loops 44-1 through 44-$N_{SG}$ (generally referred to herein collectively as outer loops 44 and individually as outer loop 44) each for a different subframe group, where $N_{SG}$ is an integer that is greater than 2 and corresponds to the number of subframe groups. Notably, in some embodiments, the number subframe groups are dynamically configured and, in some scenarios, the number of subframe groups may be equal to 1 where all of the subframes are in a single subframe group. However, in general, the number of subframe groups is greater than or equal to 2. The link adaptation system 42 also includes link adaptation functions 46-1 through 46-$N_{SG}$ for the subframe groups. Note that while the link adaptation functions 46-1 through 46-$N_{SG}$ are illustrated separately, the link adaptation functions 46-1 through 46-$N_{SG}$ may be implemented separately or as part of a single link adaptation entity (e.g., a single link adaptation subsystem or process).

In operation, the outer loop 44-1 receives HARQ acknowledgements from the mobile terminal 16 for downlink transmissions to the mobile terminal 16 in the subframes in the first subframe group (SF Group 1). Again, as used herein, a HARQ acknowledgement is either a positive HARQ acknowledgement (i.e., a HARQ ACK) or a negative HARQ acknowledgement (i.e., a HARQ NACK). The outer loop 44-1 processes the HARQ acknowledgements from the mobile terminal 16 for the subframes in the first subframe group (SF Group 1) and a target BLER to generate a SINR offset for the first subframe group (SF Group 1). Notably, the target BLER is preferably, but not necessarily, the same for all of the subframe groups. In general, the outer loop 44-1 increases the SINR offset for the first subframe group (SF Group 1) in response to a positive HARQ acknowledgement for any of the subframes in the first subframe group (SF Group 1) and decreases the SINR offset for the first subframe group (SF Group 1) in response to a negative HARQ acknowledgement for any of the subframes in the first subframe group (SF Group 1). In one embodiment, a SINR offset step-up size when increasing the SINR offset and a SINR offset step-down size when decreasing the SINR offset are a function of the target BLER. In one particular embodiment, the step-up size and the step-down size are defined as:

$$\text{Target } BLER = \frac{1}{1 + \frac{SINR \text{ offset step-down size}}{SINR \text{ offset step-up size}}}.$$

So, if for example the target BLER is 10%, then a ratio of the SINR offset step-down size to the SINR offset step-up size is equal to 9.

The link adaptation function 46-1 for the first subframe group (SF Group 1) performs link adaptation for downlink transmissions to the mobile terminal 16 scheduled for the subframes in the first subframe group (SF Group 1) based on the SINR offset for the first subframe group (SF Group 1) from the outer loop 44-1 and CSI reports from the mobile terminal 16. Each CSI report includes a channel quality SINR for the downlink channel from the base station 14 to the mobile terminal 16. More specifically, the link adaptation function 46-1 receives downlink data for a downlink transmission to the mobile terminal 16 scheduled for one of the subframes in the first subframe group (SF Group 1), selects a MCS for the downlink transmission based on the SINR offset from the outer loop 44-1 for the first subframe group (SF Group 1) and the channel quality SINR from the CSI report, and outputs the downlink transmission with the selected MCS. In one embodiment, the link adaptation function 46-1 selects the MCS for downlink transmission based on the sum of the channel quality SINR from the CSI report and the SINR offset for the first subframe group (SF Group 1). In general, MCS is selected such that the MCS increases (i.e., is more aggressive) as the sum of the channel quality SINR and the SINR offset increases and decreases (i.e., is less aggressive) as the sum of the channel quality SINR and the SINR offset decreases. In one particular implementation, each possible MCS has a corresponding range of SINR values, and the link adaptation function 46-1 selects the MCS for the range of SINR values in which the sum of the channel quality SINR and the SINR offset falls.

In the same manner, the outer loop 44-$N_{SG}$ receives HARQ acknowledgements from the mobile terminal 16 for downlink transmissions to the mobile terminal 16 in the $N_{SG}$-th subframe group (SF Group $N_{SG}$). The outer loop 44-$N_{SG}$ processes the HARQ acknowledgements from the mobile terminal 16 for the $N_{SG}$-th subframe group (SF Group $N_{SG}$) and the target BLER to generate a SINR offset for the $N_{SG}$-th subframe group (SF Group $N_{SG}$). In general, the outer loop 44-$N_{SG}$ increases the SINR offset for the $N_{SG}$-th subframe group (SF Group $N_{SG}$) in response to a positive HARQ acknowledgement for any one of the subframes in the $N_{SG}$-th subframe group (SF Group $N_{SG}$) and decreases the SINR offset for the $N_{SG}$-th subframe group (SF Group $N_{SG}$) in response to a negative HARQ acknowledgement for any one of the subframes in the $N_{SG}$-th subframe group (SF Group $N_{SG}$). As discussed above, in one embodiment, a SINR offset step-up size when increasing the SINR offset and a SINR offset step-down size when decreasing the SINR offset are a function of the target BLER.

The link adaptation function 46-$N_{SG}$ for the $N_{SG}$-th subframe group (SF Group $N_{SG}$) performs link adaptation for downlink transmissions to the mobile terminal 16 scheduled for the subframes in the $N_{SG}$-th subframe group (SF Group $N_{SG}$) based on the SINR offset for the $N_{SG}$-th subframe group (SF Group $N_{SG}$) from the outer loop 44-$N_{SG}$ and CSI reports from the mobile terminal 16. Each CSI report includes a channel quality SINR for the downlink channel from the base station 14 to the mobile terminal 16. More specifically, the link adaptation function 46-$N_{SG}$ receives downlink data for a downlink transmission to the mobile terminal 16 scheduled for one of the subframes in the $N_{SG}$-th subframe group (SF Group $N_{SG}$), selects a MCS for the downlink transmission based on the SINR offset from the outer loop 44-$N_{SG}$ for the $N_{SG}$-th subframe group (SF Group $N_{SG}$) and the channel quality SINR from the CSI report, and outputs the downlink transmission with the selected MCS. In one embodiment, the link adaptation function 46-$N_{SG}$ selects the MCS for the downlink transmission based on the sum of the channel quality SINR from the CSI report and the SINR offset for the $N_{SG}$-th subframe group (SF Group $N_{SG}$). In general, MCS is selected such that the MCS increases (i.e., is more aggressive) as the sum of the channel quality SINR and the SINR offset increases and decreases (i.e., is less aggressive) as the sum of the channel quality SINR and the SINR offset decreases. In one particular implementation, each possible MCS has a corresponding range of SINR values, and the link adaptation function 46-$N_{SG}$ selects the MCS for the range of SINR values in which the sum of the channel quality SINR and the SINR offset falls.

Thus, unlike the conventional link adaptation system 18 of FIG. 3 where a single SINR offset is generated for all subframes, the link adaptation system 42 of FIG. 9 generates separate SINR offsets for each of the subframe groups. In this manner, the link adaptation system 42 provides subframe-based link adaptation and, more specifically, subframe-based adaptive MCS selection. As a result, the link adaptation system 42 compensates for variations in noise and interference from subframe to subframe as well as variations in the pseudo-random number generator seed from subframe to subframe. By doing so, an appropriate MCS is selected for each subframe and, as a result, downlink throughput is substantially improved.

Figure 10:
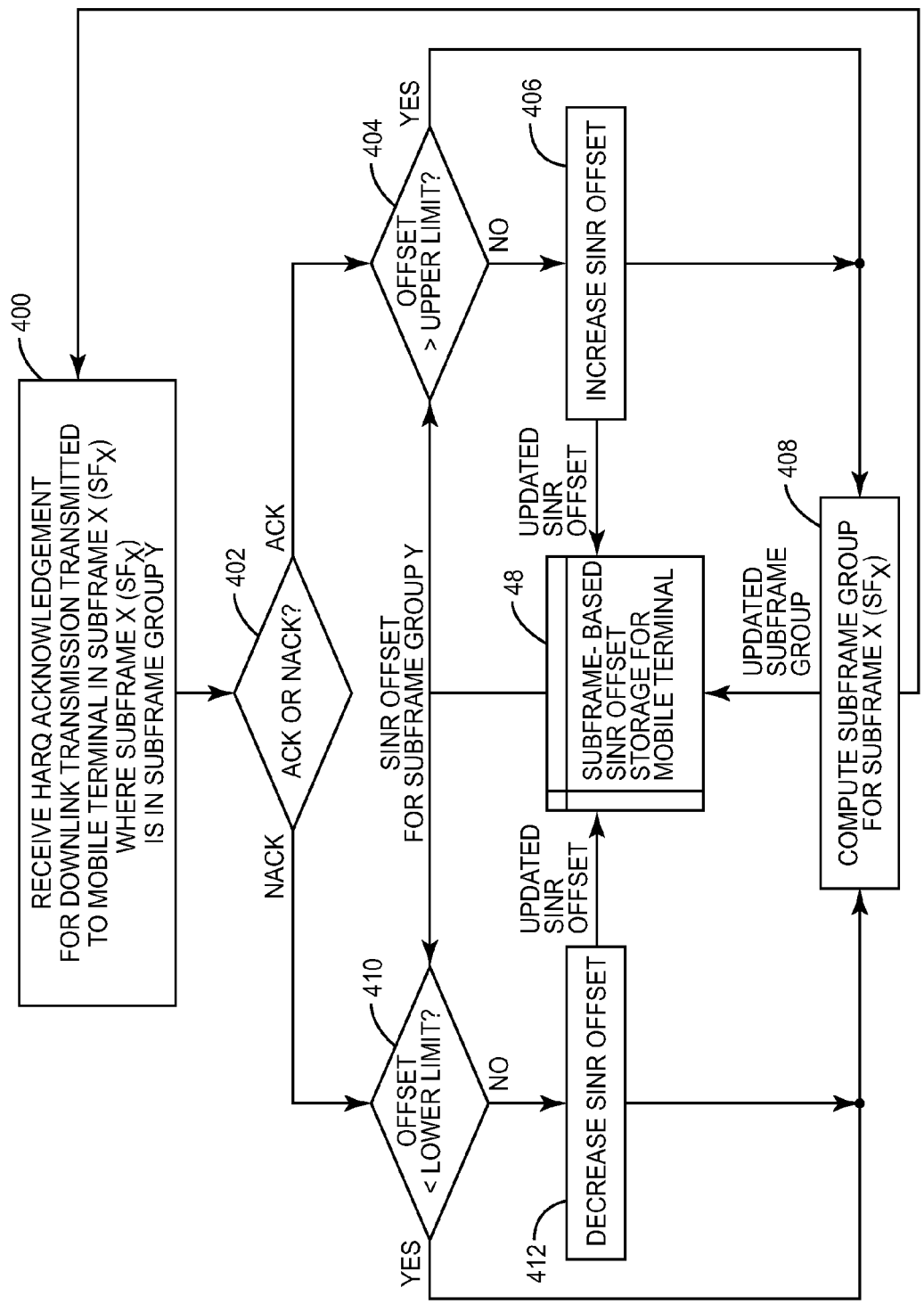
FIG. 10 is a flow chart that illustrates the operation of one of the outer loops of FIG. 9 to provide a link adaptation parameter, namely a SINR offset, to enable subframe-based link adaptation according to one embodiment of the present disclosure.

FIG. 10 is a flow chart that illustrates the operation of one of the outer loops 44 of FIG. 9 according to one embodiment of the present disclosure. In particular, FIG. 10 illustrates the operation of the outer loop 44-Y for subframe group Y, where subframe group Y is any one of the subframe groups SF Group 1 through SF Group $N_{SG}$. The outer loop 44-Y first receives a HARQ acknowledgement from the mobile terminal 16 for a downlink transmission to the mobile terminal 16 in subframe X ($SF_X$) of the downlink frame structure (FIG. 2) (step 400). Here, subframe X ($SF_X$) is one of the subframes ($SF_1$ through $SF_{10}$) that is in the subframe group Y. The outer loop 44-Y then determines whether the HARQ acknowledgement is a positive HARQ acknowledgement (i.e., a HARQ ACK) or a negative HARQ acknowledgement (i.e., a HARQ NACK) (step 402). If the HARQ acknowledgement is a positive HARQ acknowledgement, the outer loop 44-Y then determines whether the SINR offset for the subframe group Y for the mobile terminal 16 is greater than a predefined upper limit (step 404). Notably, the SINR offset for the subframe group Y for the mobile terminal 16 is stored by the base station 14 in a subframe-based SINR offset storage 48 for the mobile terminal 16.

If the SINR offset for the subframe group Y for the mobile terminal 16 is greater than the predefined upper limit, the process proceeds to step 408. However, if the SINR offset for the subframe group Y for the mobile terminal 16 is not greater than the predefined upper limit, the outer loop 44-Y increases the SINR offset (step 406). The resulting updated SINR offset is then stored in the subframe-based SINR offset storage 48 for the mobile terminal 16. As discussed above, in one embodiment, the SINR offset step-up size when increasing the SINR offset is a function of the target BLER.

After increasing the SINR offset for the subframe group Y for the mobile terminal 16 or after determining that the SINR offset for the subframe group Y for the mobile terminal 16 is greater than the predefined upper limit, the outer loop 44-Y computes the subframe group for $SF_X$ (step 408). Note that, in this embodiment, step 408 is only performed for the first iteration of the loop in FIG. 10. In other words, once the subframe group for $SF_X$ for the mobile terminal 16 is computed, the subframe group for $SF_X$ for the mobile terminal 16 remains the same (i.e., is static). Further, while computing the subframe group for $SF_X$ is illustrated as being part of the process of FIG. 10, the present disclosure is not limited thereto. In one embodiment, the subframe group for $SF_X$ is computed as follows. First, a possible range of BLER values is defined as $BLER_{MIN}$ to $BLER_{MAX}$. This possible range of BLER values is divided into $N_{SG}$ BLER regions that correspond to the $N_{SG}$ subframe groups. Notably, the BLER regions may be of equal or unequal sizes. For example, the BLER regions can be larger at lower BLER range(s). The BLER for $SF_X$ is then used to assign $SF_X$ to one of the subframe groups. Once step 408 is complete, the process returns to step 400 in order to wait for and then process the next HARQ acknowledgement from the mobile terminal 16 for any one of the subframes in the subframe group Y.

Returning to step 402, if the HARQ acknowledgement is a negative HARQ acknowledgement, the outer loop 44-Y then determines whether the SINR offset for the subframe group Y for the mobile terminal 16 is less than a predefined lower limit (step 410). If the SINR offset for the subframe group Y for the mobile terminal 16 is less than the predefined lower limit, the process proceeds to step 408 in order to compute the subframe group for $SF_X$. However, if the SINR offset for the subframe group Y for the mobile terminal 16 is not less than the predefined lower limit, the outer loop 44-Y decreases the SINR offset (step 412). The resulting updated SINR offset is then stored in the subframe-based SINR offset storage 48 for the mobile terminal 16. As discussed above, in one embodiment, the SINR offset step-down size when decreasing the SINR offset is a function of the target BLER. After decreasing the SINR offset for the subframe group Y for the mobile terminal 16, the process proceeds to step 408, as discussed above, and then returns to step 400 in order to wait for and then process the next HARQ acknowledgement from the mobile terminal 16 for any one of the subframes in the subframe group Y.

Figure 11:
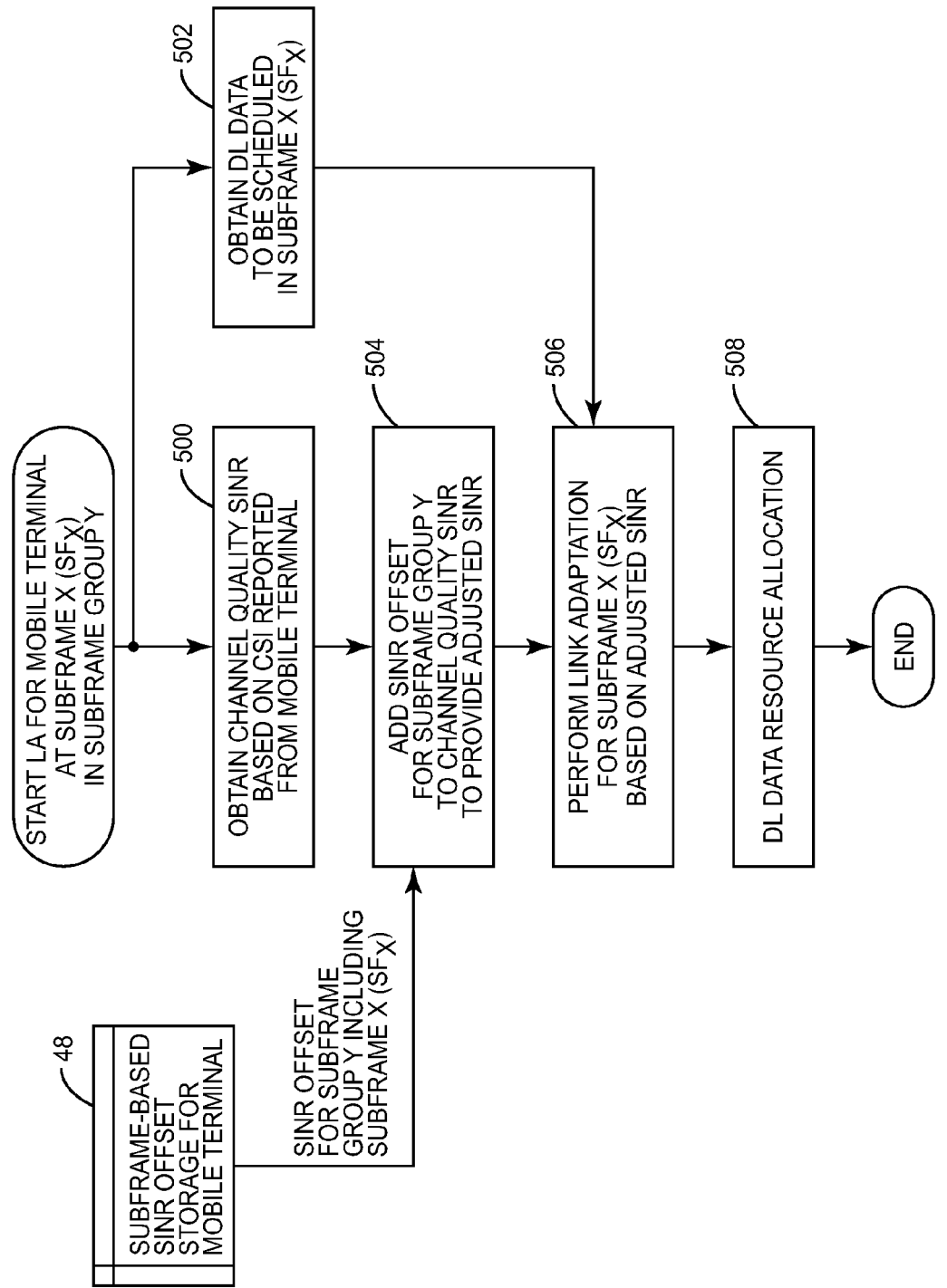
FIG. 11 is a flow chart that illustrates the operation of the link adaptation function of FIG. 9 to adaptively select a MCS for a subframe group based on the link adaptation parameter from the outer loop for the subframe group according to one embodiment of the present disclosure.

FIG. 11 is a flow chart that illustrates the operation of one of the link adaptation functions 46 of FIG. 9 according to one embodiment of the present disclosure. In particular, FIG. 11 illustrates the operation of the link adaptation function 46-Y for the subframe group Y, where subframe group Y is one of the subframe groups (SF Group 1 through SF Group $N_{SG}$) that includes subframe X ($SF_X$) and subframe X ($SF_X$) is any one of the subframes ($SF_1$ through $SF_{10}$) in the downlink frame structure (FIG. 2). First, the link adaptation function 46-Y obtains a channel quality SINR based on the CSI report from the mobile terminal 16 (step 500). In LTE, the CSI report includes a CSI that represents the channel quality SINR. In addition, the link adaptation function 46-Y obtains downlink data to be scheduled for transmission to the mobile terminal 16 in $SF_X$, which again is in the subframe group Y (step 502).

Next, the link adaptation function 46-Y adds the SINR offset for the subframe group Y generated by the outer loop 44-Y and the channel quality SINR obtained from the CSI report to provide an adjusted SINR (step 504). The link adaptation function 46-Y then performs link adaptation for $SF_X$ based on the adjusted SINR (step 506). More specifically, the link adaptation function 46-Y selects or updates the MCS for the downlink transmission to the mobile terminal 16 in $SF_X$ based on the adjusted SINR. Lastly, the link adaptation function 46-Y allocates downlink resources for a downlink transmission of the downlink data in $SF_X$ using the selected MCS (step 508).

Figure 12:
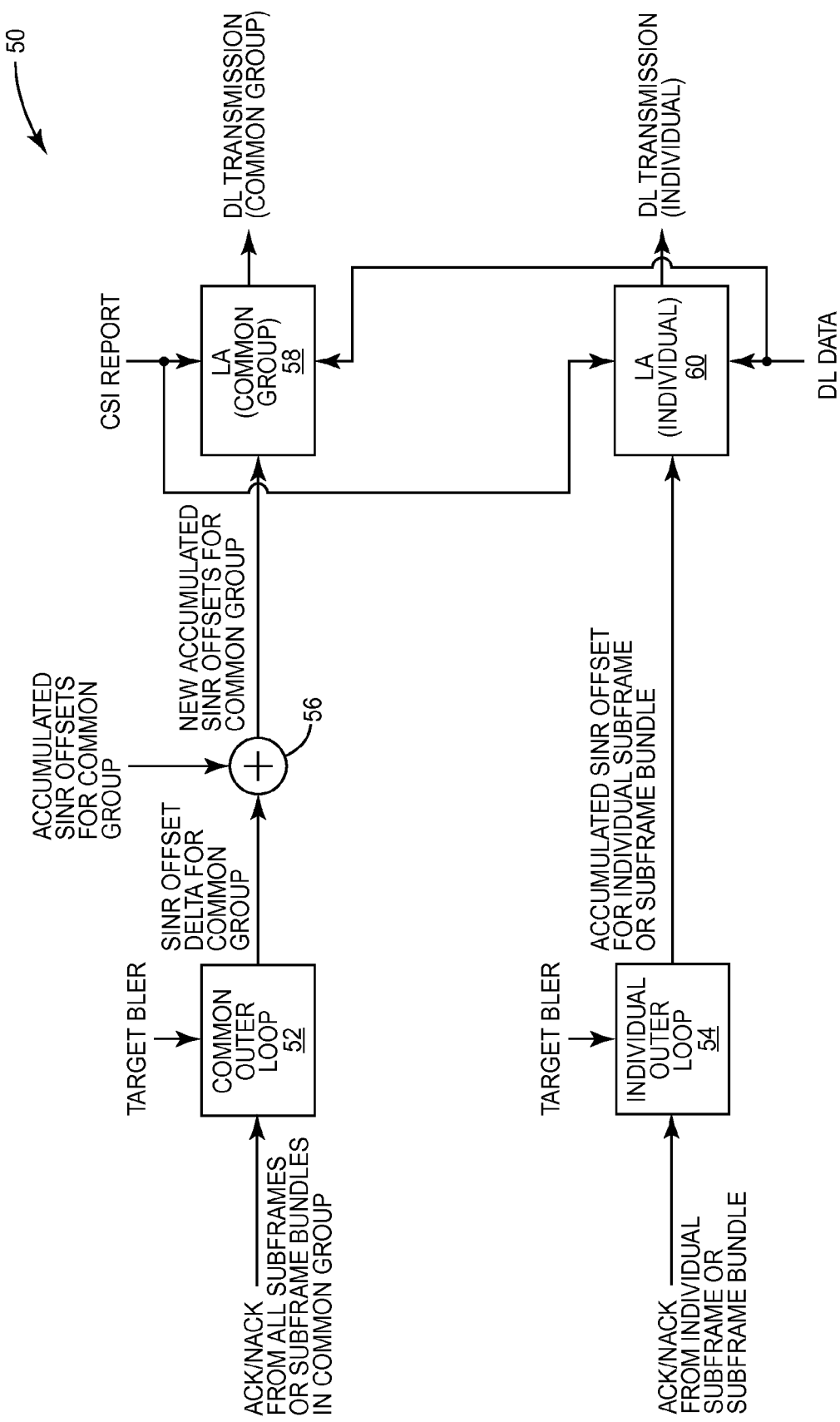
FIG. 12 illustrates a link adaptation system that includes an outer loop system having a common outer loop and an individual outer loop according to another embodiment of the present disclosure.

FIG. 12 illustrates a link adaptation system 50 according to another embodiment of the present disclosure. In this embodiment, the link adaptation system 50 includes a common outer loop 52 and an individual outer loop 54. In general, the common outer loop 52 is for a common group consisting of all subframes and/or subframe bundles except the subframe or subframe bundle having the highest BLER. The individual outer loop 54 is for the subframe or subframe bundle having the highest BLER. Notably, during operation, subframes or subframe bundles are moved from the common outer loop 52 to the individual outer loop 54 and vice versa as the BLERs for the subframes and/or subframe bundles change over time.

The common outer loop 52 generates a SINR offset delta for all subframes and/or subframe bundles in the common group based on the HARQ acknowledgements received for all of the subframes and/or subframe bundles in the common group. The SINR offset delta is a common value for all of the subframes and/or subframe bundles in the common group. More specifically, in response to receiving a positive HARQ acknowledgement, the common outer loop 52 generates a positive SINR offset delta. Similarly, in response to receiving a negative HARQ acknowledgment, the common outer loop 52 generates a negative SINR offset delta. In one embodiment, a magnitude of the positive SINR offset delta and a magnitude of the negative SINR offset delta are both a function of the target BLER. In one particular embodiment, magnitudes of the positive and negative SINR offset deltas may be defined as:

$$\text{Target } BLER = \frac{1}{1 + \frac{|\text{negative } SINR \text{ offset delta}|}{\text{positive } SINR \text{ offset delta}}}.$$

So, if for example the target BLER is 10%, then a ratio of the magnitude of the positive SINR offset delta to the magnitude of the negative SINR offset delta is equal to 9.

A combiner 56 combines the SINR offset delta from the common outer loop 52 with each of the accumulated SINR offsets of the subframes and/or subframe bundles in the common group to provide new accumulated SINR offsets for the subframes and/or subframe bundles in the common group. In this manner, the separate accumulated SINR offsets for the subframes and/or subframe bundles in the common group are updated based on the common SINR offset delta for the common group. As an example, if a positive HARQ acknowledgement is received by the common outer loop 52, the common outer loop 52 outputs a positive SINR offset delta. Then, for each subframe and/or subframe bundle in the common group, the combiner 56 adds the positive SINR offset delta to a stored accumulated SINR offset for the subframes and/or subframe bundles in the common group to provide a new, or updated, accumulated SINR offset for the subframes and/or subframe bundles in the common group. The new accumulated SINR offset for the subframes and/or subframe bundles in the common group is stored as the accumulated SINR offset for the subframes and/or subframe bundles in the common group. Likewise, if a negative HARQ acknowledgement is received by the common outer loop 52, the common outer loop 52 outputs a negative SINR offset delta. Then, for each subframe/subframe bundle in the common group, the combiner 56 adds the negative SINR offset delta and the stored accumulated SINR offset for the subframes and/or subframe bundles in the common group to provide a new, or updated, accumulated SINR offset for the subframes and/or subframe bundles in the common group. The new accumulated SINR offset for the subframes and/or subframe bundles in the common group is stored as the accumulated SINR offset for the subframes and/or subframe bundles in the common group. In this manner, a separate accumulated SINR offset is maintained for each subframe and/or subframe bundle in the common group where each accumulated SINR offset is updated using the common SINR offset delta.

A link adaptation function 58 performs link adaptation for downlink transmissions to the mobile terminal 16 scheduled for any of the subframes in the common group or any of the subframes in the subframe bundles in the common group based on the corresponding accumulated SINR offsets and CSI reports from the mobile terminal 16. Each CSI report includes a channel quality SINR for the downlink channel from the base station 14 to the mobile terminal 16. More specifically, the link adaptation function 58 receives downlink data for a downlink transmission to the mobile terminal 16 scheduled for one or more of the subframes or subframe bundles in the common group. For each downlink transmission, the link adaptation function 58 selects a MCS for the downlink transmission based on the accumulated SINR offset for the corresponding subframe or subframe bundle and the channel quality SINR from the CSI report and outputs the downlink transmission with the selected MCS. In one embodiment, the link adaptation function 58 selects the MCS for the downlink transmission based on the sum of the channel quality SINR from the CSI report and the accumulated SINR offset for the corresponding subframe or subframe bundle. In general, MCS is selected such that the MCS increases (i.e., is more aggressive) as the sum of the channel quality SINR and the accumulated SINR offset increases and decreases (i.e., is less aggressive) as the sum of the channel quality SINR and the accumulated SINR offset decreases. In one particular implementation, each possible MCS has a corresponding range of SINR values, and the link adaptation function 58 selects the MCS for the range of SINR values in which the sum of the channel quality SINR and the accumulated SINR offset falls.

The individual outer loop 54 operates to generate an accumulated SINR offset for the individual subframe or subframe bundle selected for the individual outer loop 54 in the manner described above with respect to, for example, the outer loop 26 (subframe) or the outer loop 34 (subframe bundle) (FIGS. 5 and 8). In operation, the individual outer loop 54 receives HARQ acknowledgements from the mobile terminal 16 for downlink transmissions to the mobile terminal 16 in the subframe or subframe bundle in the individual outer loop 54. The individual outer loop 54 processes the HARQ acknowledgements from the mobile terminal 16 and the target BLER to generate an accumulated SINR offset for the individual subframe or subframe bundle. In general, the individual outer loop 54 increases the accumulated SINR offset for the individual subframe or subframe bundle in response to a positive HARQ acknowledgement for the subframe or subframe bundle and decreases the accumulated SINR offset for the individual subframe or subframe bundle in response to a negative HARQ acknowledgement for the individual subframe or subframe bundle. As discussed above, in one embodiment, a SINR offset step-up size when increasing the SINR offset and a SINR offset step-down size when decreasing the SINR offset are a function of the target BLER.

A link adaptation function 60 performs link adaptation for downlink transmissions to the mobile terminal 16 scheduled for the individual subframe or one of the subframes in the individual subframe bundle based on the accumulated SINR offset for the individual subframe or subframe bundle from the individual outer loop 54 and CSI reports from the mobile terminal 16. Each CSI report includes a channel quality SINR for the downlink channel from the base station 14 to the mobile terminal 16. More specifically, the link adaptation function 60 receives downlink data for a downlink transmission to the mobile terminal 16 scheduled for the individual subframe or one of the subframes in the individual subframe bundle, selects a MCS for the downlink transmission based on the accumulated SINR offset from the individual outer loop 54 for the individual subframe or subframe bundle and the channel quality SINR from the CSI report, and outputs the downlink transmission with the selected MCS. In one embodiment, the link adaptation function 60 selects the MCS for the downlink transmission based on the sum of the channel quality SINR from the CSI report and the accumulated SINR offset for the individual subframe or subframe bundle. In general, MCS is selected such that the MCS increases (i.e., is more aggressive) as the sum of the channel quality SINR and the accumulated SINR offset increases and decreases (i.e., is less aggressive) as the sum of the channel quality SINR and the accumulated SINR offset decreases. In one particular implementation, each possible MCS has a corresponding range of SINR values, and the link adaptation function 60 selects the MCS for the range of SINR values in which the sum of the channel quality SINR and the accumulated SINR offset falls. Note that while the link adaptation functions 58 and 60 are illustrated separately, the link adaptation functions 58 and 60 may be implemented separately or as part of a single link adaptation entity (e.g., a single link adaptation subsystem or process).

Figure 13:
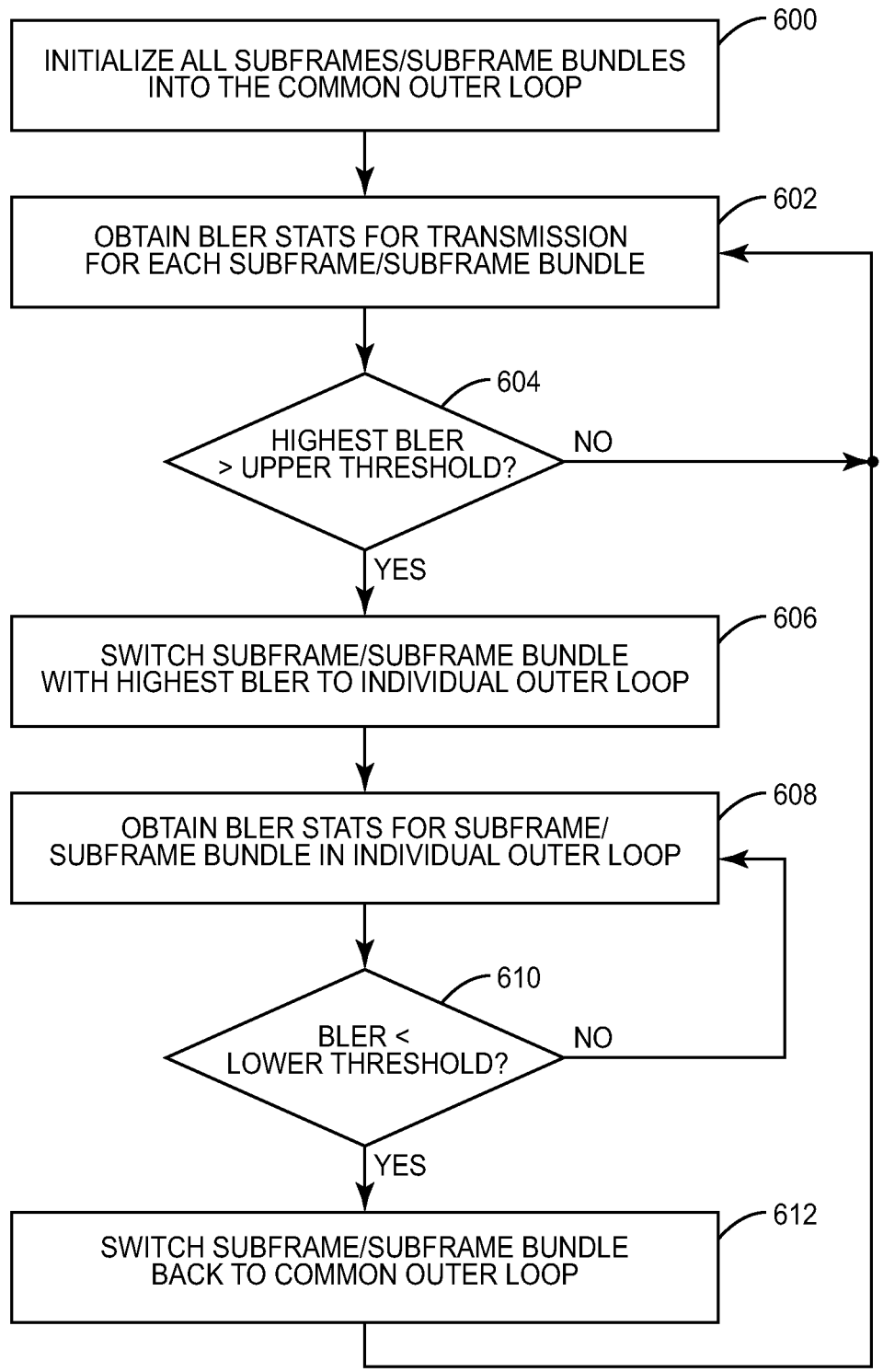
FIG. 13 is a flow chart that illustrates a process for controlling the outer loop systems of FIG. 12 according to one embodiment of the present disclosure.

FIG. 13 is a flow chart that illustrates the operation of the base station 14 to assign the subframes and/or subframe bundles to the common outer loop 52 and the individual outer loop 54 in the link adaptation system 50 of FIG. 13 according to one embodiment of the present disclosure. First, the base station 14 initializes all of the subframes and/or subframe bundles into the common outer loop 52 (i.e., into the common group) (step 600). As a result, the common outer loop 52 operates to provide a SINR offset delta for all of the subframes and/or subframe bundles in the common group based on HARQ acknowledgements received for all of the subframes and/or subframe bundles in the common group. As discussed above, the SINR offset delta is used to update the separate accumulated SINR offsets for all of the subframes and/or subframe bundles in the common group. Initially, the accumulated SINR offsets may be set to some predefined initial value such as, for example, zero.

Next, the base station 14 obtains BLER statistics for a first downlink transmission to the mobile terminal 16 for each of the subframes and/or subframe bundles in the common group (step 602). Here, the "first" downlink transmission to the mobile terminal 16 is an initial downlink transmission of data rather than a redundant version of the data in a subsequent HARQ transmission. The BLER statistics for a subframe or subframe bundle preferably include a moving window of a desired number of the most recent first transmissions to the mobile terminal 16 in the subframe or subframe bundle. The base station 14 then determines whether the BLER for the subframe or subframe bundle having the highest BLER among all of the subframes or subframe bundles is greater than a predefined upper threshold (step 604). The predefined upper threshold is greater than or equal to the target BLER. For convenience, the subframe or subframe group having the highest BLER is referred to in this discussion of FIG. 13 as subframe or subframe bundle X.

If the BLER for subframe or subframe bundle X is not greater than the predefined upper threshold, the process returns to step 602. If the BLER for subframe or subframe bundle X is greater than the predefined upper threshold, the base station 14 switches the subframe or subframe bundle X to the individual outer loop 54 (step 606). As a result, the individual outer loop 54 then begins to update the accumulated SINR offset for the subframe or subframe bundle X based only on the HARQ acknowledgements received for downlink transmissions to the mobile terminal 16 in the subframe or subframe bundle X.

While the individual outer loop 54 operates to update the accumulated SINR offset for the subframe or subframe bundle X, the base station 14 obtains BLER statistics for the subframe or subframe bundle X (step 608) and determines whether the BLER for the subframe or subframe bundle X has fallen below a predefined lower threshold (step 610).

The predefined lower threshold is less than or equal to the target BLER. If not, the process returns to step 608 and continues until the BLER for the subframe or subframe bundle X falls below the predefined lower threshold. Once the BLER for the subframe or subframe bundle X falls below the predefined lower threshold, the base station 14 switches the subframe or subframe bundle X back to the common outer loop 52 (step 612). The process then returns to step 602 and is repeated. Using the process of FIG. 13, the link adaptation system 50 is enabled to compensate for variations in interference levels in different subframes over time.

Figure 14:
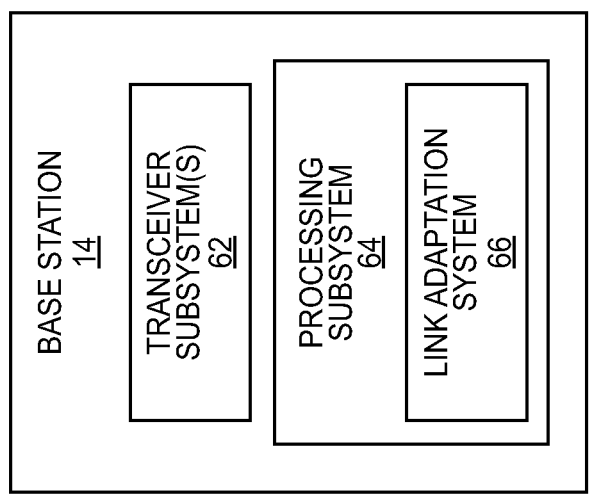
FIG. 14 is a block diagram of one of the base stations of FIG. 1 according to one embodiment of the present disclosure.

FIG. 14 is a block diagram of one of the base stations 14 of FIG. 1 according to one embodiment of the present disclosure. As illustrated, the base station 14 includes one or more transceiver subsystems 62 and a processing subsystem 64. One of the one or more transceiver subsystems 62 generally include analog and, in some embodiments, digital components for sending and receiving data to and from the mobile terminals 16. From a wireless communications protocol view, the one or more transceiver subsystems 62 implement at least part of Layer 1 (i.e., the Physical or "PHY" Layer). The processing subsystem 64 generally implements any remaining portion of Layer 1 as well as functions for higher layers in the wired or wireless communications protocol (e.g., Layer 2 (data link layer), Layer 3 (network layer), etc.). Of course, the detailed operation for each of the functional protocol layers, and thus the one or more transceiver subsystems 62 and the processing subsystem 64, will vary depending on both the particular implementation as well as the standard or standards supported by the base station 14. In this embodiment, the processing subsystem 64 includes a link adaptation system 66, where the link adaptation system 66 can be any one of the subframe-based link adaptation systems disclosed herein.

Figure 15:
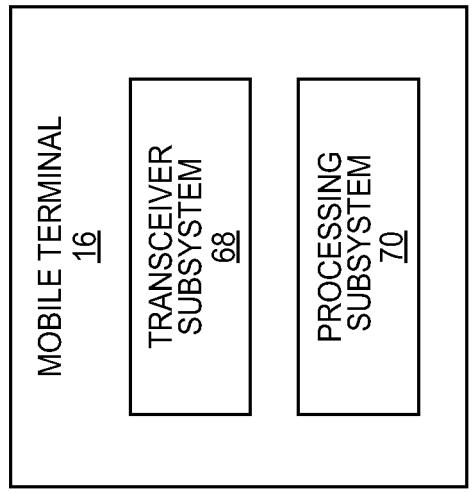
FIG. 15 is a block diagram of one of the mobile terminals of FIG. 1 according to one embodiment of the present disclosure.

FIG. 15 is a block diagram of the mobile terminal 16 of FIG. 1 according to one embodiment of the present disclosure. As illustrated, the mobile terminal 16 includes a transceiver subsystem 68 and a processing subsystem 70. The transceiver subsystem 68 generally includes analog and, in some embodiments, digital components for sending and receiving data to and from the base stations 14. From a wireless communications protocol view, the transceiver subsystem 68 implements at least part of Layer 1 (i.e., the Physical or "PHY" Layer). The processing subsystem 70 generally implements any remaining portion of Layer 1 as well as functions for higher layers in the wireless communications protocol (e.g., Layer 2 (data link layer), Layer 3 (network layer), etc.). Of course, the detailed operation for each of the functional protocol layers, and thus the transceiver subsystem 68 and the processing subsystem 70, will vary depending on both the particular implementation as well as the standard or standards supported by the mobile terminal 16.

Those skilled in the art will appreciate that the block diagrams of the base station 14 and the mobile terminal 16 in FIGS. 14 and 15, respectively, necessarily omit numerous features that are not necessary to a complete understanding of this disclosure. For instance, although all of the details of the processing subsystems 64 and 70 are not illustrated, those skilled in the art will recognize that the processing subsystems 64 and 70 comprise one or several general-purpose or special-purpose microprocessors or other microcontrollers programmed with suitable software and/or firmware to carry out some or all of the functionality of the base station 14 and the mobile terminal 16 described herein. In addition or alternatively, the processing subsystems 64 and 70 may comprise various digital hardware blocks (e.g., one or more Application Specific Integrated Circuits (ASICs), one or more off-the-shelf digital and analog hardware components, or a combination thereof) configured to carry out some or all of the functionality of the base station 14 and the mobile terminal 16 described herein.

Lastly, it should be noted that while most of the embodiments described above provide link adaptation for the downlink from the base station 14 to the mobile terminal 16, the present disclosure is not limited thereto. The systems and methods described herein may additionally or alternatively be used to perform subframe-based link adaptation for the uplink from the mobile terminal 16 to the base station 14. More specifically, in one embodiment, the base station 14 includes a link adaptation system that includes a separate outer loop for each subframe in the uplink frame structure, a separate outer loop for each of a number of subframe bundles or subframe groups, or a combination thereof. The link adaptation system for the uplink performs link adaptation for the uplink from the mobile terminal 16 to the base station 14 based on HARQ acknowledgements generated locally by the base station 14 for data transmissions from the mobile terminal 16 to the base station 14 via the uplink signal. In another embodiment, the link adaptation system for the uplink may include a common outer loop and an individual outer loop in a manner similar to that described above with respect to FIGS. 12 and 13.

The following acronyms are used throughout this disclosure.

3GPP 3$^{rd}$ Generation Partnership Project
ABS Almost Blank Subframe
AMC Adaptive Modulation and Coding
ASIC Application Specific Integrated Circuit
BLER Block Error Rate
CQI Channel-Quality Indicator
CSI Channel State Information
DL Downlink
eNB Enhanced Node B
EVM Error Vector Magnitude
HARQ Hybrid Automatic Repeat Request
LA Link Adaptation
LTE Long Term Evolution
MCS Modulation and Coding Scheme
ms Millisecond
MT Mobile Terminal
OFDM Orthogonal Frequency Division Multiplexing
PAR Peak-to-Average Ratio
QAM Quadrature Amplitude Modulation
QPSK Quadrature Phase Shift Keying
SINR Signal to Interference Plus Noise
SRS Sounding Reference Signal
TDD Time Division Duplexing
TS Technical Specification
TTI Transmit Time Interval
UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A method of operation of a base station in a cellular communications network, the method comprising:
  obtaining a first hybrid automatic repeat request acknowledgement for data transmitted between the base station and a mobile terminal in a radio signal and a second hybrid automatic repeat request acknowledgement for data transmitted between the base station and the mobile terminal in the radio signal;

updating a first link adaptation parameter used to control a modulation and coding scheme for transmission of data in the radio signal for one or more subframes in a frame structure of the radio signal based on the first hybrid automatic repeat request acknowledgement, the one or more subframes being a subset of a plurality of subframes in the frame structure of the radio signal; and updating a second link adaptation parameter used to control a modulation and coding scheme for transmission of data between the base station and the mobile terminal in the radio signal for one or more different subframes in the frame structure of the radio signal based on the second hybrid automatic repeat request acknowledgement, the one or more different subframes being a second subset of the plurality of subframes in the frame structure of the radio signal.

2. The method of claim 1 wherein the radio signal is a downlink signal from the base station to the mobile terminal, and obtaining the first and second hybrid automatic repeat request acknowledgements comprises receiving the first and second hybrid automatic repeat request acknowledgements for data transmitted from the base station to the mobile terminal in the downlink signal.

3. The method of claim 1 wherein the radio signal is an uplink signal from the mobile terminal to the base station, and obtaining the first and second hybrid automatic repeat request acknowledgements comprises generating the first and second hybrid automatic repeat request acknowledgments locally at the base station for data transmitted from the mobile terminal to the base station in the uplink signal.

4. The method of claim 1 wherein:

obtaining the first hybrid automatic repeat request acknowledgement comprises obtaining the first hybrid automatic repeat request acknowledgement for data transmitted between the base station and the mobile terminal in a single subframe of the plurality of subframes in the frame structure of the radio signal; and updating the first link adaptation parameter used to control the modulation and coding scheme comprises updating the first link adaptation parameter used to control a modulation and coding scheme for transmission of data between the base station and the mobile terminal in the radio signal for only the single subframe based on the first hybrid automatic repeat request acknowledgement obtained for the data transmitted between the base station and the mobile terminal in the single subframe.

5. The method of claim 4 wherein the first hybrid automatic repeat request acknowledgement is a positive hybrid automatic repeat request acknowledgement, and updating the first link adaptation parameter used to control the modulation and coding scheme for transmission of data between the base station and the mobile terminal in the radio signal for only the single subframe comprises updating the first link adaptation parameter in a manner that corresponds to an increase in the modulation and coding scheme for transmission of data between the base station and the mobile terminal in the radio signal for only the single subframe in response to the positive hybrid automatic repeat request acknowledgement.

6. The method of claim 4 wherein the first hybrid automatic repeat request acknowledgement is a positive hybrid automatic repeat request acknowledgement and the first link adaptation parameter is a signal to interference plus noise offset for the single subframe for the mobile terminal, and updating the first link adaptation parameter used to control the modulation and coding scheme for transmission of data between the base station and the mobile terminal in the radio signal for only the single subframe comprises increasing the signal to interference plus noise offset for the single subframe for the mobile terminal in response to the positive hybrid automatic repeat request acknowledgement.

7. The method of claim 6 further comprising:

combining a channel quality signal to interference plus noise value for the radio signal and the signal to interference plus noise offset for the single subframe for the mobile terminal to provide an adjusted signal to interference plus noise value; and performing a link adaptation process based on the adjusted signal to interference plus noise value to thereby update the modulation and coding scheme for transmission of data between the base station and the mobile terminal in the radio signal for only the single subframe.

8. The method of claim 4 wherein the first hybrid automatic repeat request acknowledgement is a negative hybrid automatic repeat request acknowledgement, and updating the first link adaptation parameter used to control the modulation and coding scheme for transmission of data between the base station and the mobile terminal in the radio signal for only the single subframe comprises updating the first link adaptation parameter in a manner that corresponds to a decrease in the modulation and coding scheme for transmission of data between the base station and the mobile terminal in the radio signal for only the single subframe in response to the negative hybrid automatic repeat request acknowledgement.

9. The method of claim 4 wherein the first hybrid automatic repeat request acknowledgement is a negative hybrid automatic repeat request acknowledgement and the first link adaptation parameter is a signal to interference plus noise offset for the single subframe for the mobile terminal, and updating the first link adaptation parameter used to control the modulation and coding scheme for transmission of data between the base station and the mobile terminal in the radio signal for only the single subframe comprises decreasing the signal to interference plus noise offset for the single subframe for the mobile terminal in response to the negative hybrid automatic repeat request acknowledgement.

10. The method of claim 9 further comprising:

combining a channel quality signal to interference plus noise value for the radio signal and the signal to interference plus noise offset for the single subframe for the mobile terminal to provide an adjusted signal to interference plus noise value; and performing a link adaptation process based on the adjusted signal to interference plus noise value to thereby update the modulation and coding scheme for transmission of data between the base station and the mobile terminal in the radio signal for only the single subframe.

11. The method of claim 1 wherein:

obtaining the first hybrid automatic repeat request acknowledgement comprises obtaining the first hybrid automatic repeat request acknowledgement for data transmitted between the base station and the mobile terminal in a bundle of subframes, the bundle of subframes being two or more subframes in the plurality of subframes in the frame structure of the radio signal that are bundled for hybrid automatic repeat request acknowledgement reporting to the base station; and updating the first link adaptation parameter used to control the modulation and coding scheme comprises updating the first link adaptation parameter used to control a modulation and coding scheme for transmission of data between the base station and the mobile terminal in the radio signal for only the bundle of subframes based on the first hybrid automatic repeat request acknowledgement obtained for the data transmitted between the base station and the mobile terminal in the bundle of subframes.

12. The method of claim 11 wherein the first hybrid automatic repeat request acknowledgement is a positive hybrid automatic repeat request acknowledgement, and updating the first link adaptation parameter used to control the modulation and coding scheme for transmission of data between the base station and the mobile terminal in the radio signal for only the bundle of subframes comprises updating the first link adaptation parameter in a manner that corresponds to an increase in the modulation and coding scheme for transmission of data between the base station and the mobile terminal in the radio signal for only the bundle of subframes in response to the positive hybrid automatic repeat request acknowledgement.

13. The method of claim 11 wherein the first hybrid automatic repeat request acknowledgement is a positive hybrid automatic repeat request acknowledgement and the first link adaptation parameter is a signal to interference plus noise offset for the bundle of subframes for the mobile terminal, and updating the first link adaptation parameter used to control the modulation and coding scheme for transmission of data between the base station and the mobile terminal in the radio signal for only the bundle of subframes comprises increasing the signal to interference plus noise offset for the bundle of subframes for the mobile terminal in response to the positive hybrid automatic repeat request acknowledgement.

14. The method of claim 13 further comprising:
combining a channel quality signal to interference plus noise value for the radio signal and the signal to interference plus noise offset for the bundle of subframes for the mobile terminal to provide an adjusted signal to interference plus noise value; and
performing a link adaptation process based on the adjusted signal to interference plus noise value to thereby update the modulation and coding scheme for transmission of data between the base station and the mobile terminal in the radio signal for only the bundle of subframes.

15. The method of claim 11 wherein the first hybrid automatic repeat request acknowledgement is a negative hybrid automatic repeat request acknowledgement, and updating the first link adaptation parameter used to control the modulation and coding scheme for transmission of data between the base station and the mobile terminal in the radio signal for only the bundle of subframes comprises updating the first link adaptation parameter in a manner that corresponds to a decrease in the modulation and coding scheme for transmission of data between the base station and the mobile terminal in the radio signal for only the bundle of subframes in response to the negative hybrid automatic repeat request acknowledgement.

16. The method of claim 11 wherein the first hybrid automatic repeat request acknowledgement is a negative hybrid automatic repeat request acknowledgement and the first link adaptation parameter is a signal to interference plus noise offset for the bundle of subframes for the mobile terminal, and updating the first link adaptation parameter used to control the modulation and coding scheme for transmission of data between the base station and the mobile terminal in the radio signal for only the bundle of subframes comprises decreasing the signal to interference plus noise offset for the bundle of subframes for the mobile terminal in response to the negative hybrid automatic repeat request acknowledgement.

17. The method of claim 16 further comprising:
combining a channel quality signal to interference plus noise value for the radio signal and the signal to interference plus noise offset for the bundle of subframes for the mobile terminal to provide an adjusted signal to interference plus noise value; and
performing a link adaptation process based on the adjusted signal to interference plus noise value to thereby update the modulation and coding scheme for transmission of data between the base station and the mobile terminal in the radio signal for only the bundle of subframes.

18. The method of claim 1 wherein:
obtaining the first hybrid automatic repeat request acknowledgement comprises obtaining the first hybrid automatic repeat request acknowledgement for data transmitted between the base station and the mobile terminal in a subframe of the plurality of subframes in the frame structure of the radio signal; and
updating the first link adaptation parameter used to control the modulation and coding scheme comprises updating the first link adaptation parameter used to control a modulation and coding scheme for transmission of data between the base station and the mobile terminal in the radio signal for only a defined group of subframes comprising the subframe based on the first hybrid automatic repeat request acknowledgement obtained for the data transmitted between the base station and the mobile terminal in the subframe.

19. The method of claim 18 wherein the defined group of subframes is a defined group of two or more but less than all of the plurality of subframes in the frame structure of the radio signal.

20. The method of claim 19 wherein the defined group of subframes is a group of two or more of the plurality of subframes in the frame structure of the radio signal having sufficiently similar block error rates.

21. The method of claim 18 wherein the defined group of subframes is a group of two or more of the plurality of subframes in the frame structure of the radio signal that are grouped based on a priori information.

22. The method of claim 18 wherein the first hybrid automatic repeat request acknowledgement is a positive hybrid automatic repeat request acknowledgement, and updating the first link adaptation parameter used to control the modulation and coding scheme for transmission of data between the base station and the mobile terminal in the radio signal for only the defined group of subframes comprises updating the first link adaptation parameter in a manner that corresponds to an increase in the modulation and coding scheme for transmission of data between the base station and the mobile terminal in the radio signal for only the defined group of subframes in response to the positive hybrid automatic repeat request acknowledgement.

23. The method of claim 18 wherein the first hybrid automatic repeat request acknowledgement is a positive hybrid automatic repeat request acknowledgement and the first link adaptation parameter is a signal to interference plus noise offset for the defined group of subframes for the mobile terminal, and updating the first link adaptation parameter used to control the modulation and coding scheme for transmission of data between the base station and the mobile terminal in the radio signal for only the defined group of subframes comprises increasing the signal to interference plus noise offset for the defined group of subframes for the mobile terminal in response to the positive hybrid automatic repeat request acknowledgement.

24. The method of claim 23 further comprising:
combining a channel quality signal to interference plus noise value for the radio signal and the signal to interference plus noise offset for the defined group of subframes for the mobile terminal to provide an adjusted signal to interference plus noise value; and
performing a link adaptation process based on the adjusted signal to interference plus noise value to thereby update the modulation and coding scheme for transmission of data between the base station and the mobile terminal in the radio signal for only the defined group of subframes.

25. The method of claim 18 wherein the first hybrid automatic repeat request acknowledgement is a negative hybrid automatic repeat request acknowledgement, and updating the first link adaptation parameter used to control the modulation and coding scheme for transmission of data between the base station and the mobile terminal in the radio signal for only the defined group of subframes comprises updating the first link adaptation parameter in a manner that corresponds to a decrease in the modulation and coding scheme for transmission of data between the base station and the mobile terminal in the radio signal for only the defined group of subframes in response to the negative hybrid automatic repeat request acknowledgement.

26. The method of claim 18 wherein the first hybrid automatic repeat request acknowledgement is a negative hybrid automatic repeat request acknowledgement and the first link adaptation parameter is a signal to interference plus noise offset for the defined group of subframes for the mobile terminal, and updating the first link adaptation parameter used to control the modulation and coding scheme for transmission of data between the base station and the mobile terminal in the radio signal for only the defined group of subframes comprises decreasing the signal to interference plus noise offset for the defined group of subframes for the mobile terminal in response to the negative hybrid automatic repeat request acknowledgement.

27. The method of claim 26 further comprising:
combining a channel quality signal to interference plus noise value for the radio signal and the signal to interference plus noise offset for the defined group of subframes for the mobile terminal to provide an adjusted signal to interference plus noise value; and
performing a link adaptation process based on the adjusted signal to interference plus noise value to thereby update the modulation and coding scheme for transmission of data to the mobile terminal in the radio signal for only the defined group of subframes.

28. A base station in a cellular communications network, the base station comprising:
a transceiver subsystem configured to provide a radio signal via a radio channel; and
a processing subsystem associated with the transceiver subsystem and configured to:
obtain a first hybrid automatic repeat request acknowledgement for data transmitted between the base station and a mobile terminal in the radio signal and a second hybrid automatic repeat request acknowledgement for data transmitted between the base station and the mobile terminal in the radio signal;
update a first link adaptation parameter used to control a modulation and coding scheme for transmission of data between the base station and the mobile terminal in the radio signal for one or more subframes in a frame structure of the radio signal based on the first hybrid automatic repeat request acknowledgement, the one or more subframes being a subset of a plurality of subframes in the frame structure of the radio signal; and
update a second link adaptation parameter used to control a modulation and coding scheme for transmission of data between the base station and the mobile terminal in the radio signal for one or more different subframes in the frame structure of the radio signal based on the second hybrid automatic repeat request acknowledgement, the one or more different subframes being a second subset of the plurality of subframes in the frame structure of the radio signal.

29. The base station of claim 28 wherein the radio signal is a downlink signal from the base station to the mobile terminal, and, in order to obtain the first and second hybrid automatic repeat request acknowledgements, the processing subsystem is further configured to receive the first and second hybrid automatic repeat request acknowledgements for data transmitted from the base station to the mobile terminal in the downlink signal.

30. The base station of claim 28 wherein the radio signal is an uplink signal from the mobile terminal to the base station, and, in order to obtain the first and second hybrid automatic repeat request acknowledgements, the processing subsystem is further configured to generate the first and second hybrid automatic repeat request acknowledgements locally at the base station for data transmitted from the mobile terminal to the base station in the uplink signal.

31. The base station of claim 28 wherein:
the first hybrid automatic repeat request acknowledgement is for data transmitted between the base station and the mobile terminal in a single subframe of the plurality of subframes in the frame structure of the radio signal; and
the one or more subframes for which the processing subsystem updates the first link adaptation parameter used to control the modulation and coding scheme consist of only the single subframe.

32. The base station of claim 28 wherein the processing subsystem comprises:
a link adaptation system comprising:
a plurality of outer loops, wherein each outer loop of the plurality of outer loops is configured to generate a link adaptation parameter for a corresponding subframe of the plurality of subframes in the frame structure of the radio signal based on one or more hybrid automatic repeat request acknowledgements obtained for data transmitted between the base station and the mobile terminal in the corresponding subframe; and
a link adaptation function configured to, for each subframe of the plurality of subframes, adaptively configure the modulation and coding scheme for data transmissions between the base station and the mobile terminal in the subframe based on the link adaptation parameter for the subframe from a corresponding one of the plurality of outer loops.

33. The base station of claim 28 wherein:

the first hybrid automatic repeat request acknowledgement is for data transmitted between the base station and the mobile terminal in a bundle of subframes, the bundle of subframes being two or more subframes in the plurality of subframes in the frame structure of the radio signal that are bundled for hybrid automatic repeat request acknowledgement reporting to the base station; and the one or more subframes for which the processing subsystem updates the first link adaptation parameter used to control the modulation and coding scheme consist of only the bundle of subframes.

34. The base station of claim 28 wherein the processing subsystem comprises:
a link adaptation system comprising:
a plurality of outer loops, wherein one of the plurality of outer loops is configured to generate a link adaptation parameter for a bundle of subframes based on one or more hybrid automatic repeat request acknowledgements obtained for data transmitted between the base station and the mobile terminal in the bundle of subframes, the bundle of subframes being two or more subframes in the plurality of subframes in the frame structure of the radio signal that are bundled for hybrid automatic repeat request acknowledgement reporting to the base station; and
a link adaptation function configured to adaptively configure the modulation and coding scheme for data transmissions between the base station and the mobile terminal in the two or more subframes in the bundle of subframes based on the link adaptation parameter for the bundle of subframes from the one of the plurality of outer loops.

35. The base station of claim 28 wherein:
the first hybrid automatic repeat request acknowledgement is for data transmitted between the base station and the mobile terminal in a subframe of the plurality of subframes in the frame structure of the radio signal; and
the one or more subframes for which the processing subsystem updates the first link adaptation parameter used to control the modulation and coding scheme consist of only a defined group of subframes comprising the subframe.

36. The base station of claim 28 wherein the processing subsystem comprises:
a link adaptation system comprising:
a plurality of outer loops for a plurality of subframe groups, wherein each outer loop of the plurality of outer loops is configured to generate a link adaptation parameter for a corresponding one of the plurality of subframe groups based on one or more hybrid automatic repeat request acknowledgements obtained for data transmitted between the base station and the mobile terminal in two or more subframes in the corresponding one of the plurality of subframe groups; and
a link adaptation function configured to, for each subframe of the plurality of subframes, adaptively configure the modulation and coding scheme for data transmissions between the base station and the mobile terminal in the subframe based on the link adaptation parameter for one of the plurality of subframe groups that includes the subframe.

37. A base station in a cellular communications network, the base station comprising:

a transceiver subsystem configured to provide a radio signal via a radio channel; and
a processing subsystem associated with the transceiver subsystem and comprising a link adaptation system, the link adaptation system comprising a common outer loop for a common group comprising multiple subframes from a plurality of subframes in a frame structure of the radio signal, and an individual outer loop for an individual subframe or subframes in an individual subframe bundle.

38. The base station of claim 37 wherein the radio signal is a downlink signal from the base station to a mobile terminal.

39. The base station of claim 37 wherein the radio signal is an uplink signal from a mobile terminal to the base station.

40. The base station of claim 37 wherein the common outer loop is configured to provide a link adaptation parameter delta for the common group based on hybrid automatic repeat request acknowledgements obtained for data transmitted between the base station and a mobile terminal in all of the multiple subframes in the common group, and the link adaptation system further comprises:
a combiner configured to update accumulated link adaptation parameters for the multiple subframes in the common group based on the link adaptation parameter delta from the common outer loop; and
a link adaptation function configured to, for each subframe of the multiple subframes in the common group, adaptively configure a modulation and coding scheme for data transmissions between the base station and the mobile terminal in the subframe based on an accumulated link adaptation parameter for the subframe.

41. The base station of claim 40 wherein the individual outer loop is for an individual subframe and is configured to update an accumulated link adaptation parameter for the individual subframe based on hybrid automatic repeat request acknowledgements obtained for data transmitted between the base station and the mobile terminal in the individual subframe, and the link adaptation system further comprises:
a link adaptation function configured to adaptively configure a modulation and coding system for data transmissions between the base station and the mobile terminal in the individual subframe based on the accumulated link adaptation parameter for the individual subframe.

42. The base station of claim 41 wherein the accumulated link adaptation parameters for the multiple subframes in the common group and the accumulated link adaptation parameter for the individual subframe are accumulated signal to interference plus noise ratio offsets.

43. The base station of claim 41 wherein the individual subframe is a subframe of the plurality of subframes having a highest block error rate.

44. The base station of claim 40 wherein the individual outer loop is for subframes in an individual subframe bundle and is configured to update an accumulated link adaptation parameter for the individual subframe bundle based on hybrid automatic repeat request acknowledgements obtained for data transmitted between the base station and the mobile terminal in the subframes in the individual subframe bundle, and the link adaptation system further comprises:
a link adaptation function configured to adaptively configure a modulation and coding system for data transmissions between the base station and the mobile terminal in the subframes in the individual subframe bundle based on the accumulated link adaptation parameter for the individual subframe bundle.

45. The base station of claim 44 wherein the accumulated link adaptation parameters for the multiple subframes in the common group and the accumulated link adaptation parameter for the individual subframe bundle are accumulated signal to interference plus noise ratio offsets.

46. The base station of claim 45 wherein the individual subframe bundle is a subframe bundle having a highest block error rate.

47. The base station of claim 37 wherein the processing subsystem is further configured to:
  initialize all subframes or subframe bundles of the plurality of subframes in the common group for the common outer loop;
  identify a subframe or subframe bundle in the common group that has a highest block error rate from among block error rates of the subframes or subframe bundles in the common group;
  in response, switch the subframe or subframe bundle that has the highest block error rate to the individual outer loop;
  monitor the block error rate of the subframe or subframe bundle in the individual outer loop until the block error rate of the subframe or subframe bundle is less than a predefined lower threshold; and
  in response, switch the subframe or subframe bundle back to the common outer loop.

* * * * *